United States Patent
Kiyota

(10) Patent No.: US 9,881,412 B2
(45) Date of Patent: Jan. 30, 2018

(54) IMAGE GENERATION DEVICE AND OPERATION SUPPORT SYSTEM

(71) Applicant: SUMITOMO HEAVY INDUSTRIES, LTD., Tokyo (JP)

(72) Inventor: Yoshihisa Kiyota, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/062,417

(22) Filed: Mar. 7, 2016

(65) Prior Publication Data

US 2016/0189420 A1   Jun. 30, 2016

Related U.S. Application Data

(63) Continuation of application No. 13/649,378, filed on Oct. 11, 2012, now abandoned, which is a (Continued)

(30) Foreign Application Priority Data

Apr. 12, 2010   (JP) ................................ 2010-091658

(51) Int. Cl.
*G06T 15/20*   (2011.01)
*E02F 9/26*   (2006.01)
(Continued)

(52) U.S. Cl.
CPC .............. *G06T 15/20* (2013.01); *E02F 9/261* (2013.01); *G06T 3/0062* (2013.01); *H04N 7/18* (2013.01);
(Continued)

(58) Field of Classification Search
None
See application file for complete search history.

(56) References Cited

U.S. PATENT DOCUMENTS 6,157,747 A    12/2000  Szeliski et al.
6,665,003 B1   12/2003  Peleg et al.
(Continued)

FOREIGN PATENT DOCUMENTS

JP    H04-136320    5/1992
JP    H05-112973    5/1993
(Continued)

OTHER PUBLICATIONS

Liu et al, "Bird's-Eye View Vision System for Vehicle Surrounding Monitoring", RobVis 2008, LNCS 4931, pp. 207-218, 2008.*
(Continued)

*Primary Examiner* — Ulka Chauhan
*Assistant Examiner* — Patrick F Valdez
(74) *Attorney, Agent, or Firm* — Ipusa, PLLC

(57) ABSTRACT

An image generation device generates an output image based on an image obtained by taking images by an image-taking part mounted to a body to be operated, which boy is capable of performing a turning operation. A coordinates correspondence part causes coordinates on a columnar space model, which is arranged to surround the body to be operated and has a center axis, to correspond to coordinates on an image plane on which the input image is positioned. An output image generation part generates the output image by causing values of the coordinates on the input image plane to correspond to values of the coordinates on an output image plane on which the output image is positioned through coordinates on the columnar space model. The columnar space model is arranged so that an optical axis of the image-taking part intersects with the center axis of said columnar space model.

2 Claims, 23 Drawing Sheets

Related U.S. Application Data continuation of application No. PCT/JP2011/058899, filed on Apr. 8, 2011.

(51) Int. Cl.
  *H04N 7/18* (2006.01)
  *G06T 3/00* (2006.01)
  *H04N 13/02* (2006.01)
  *H04N 13/04* (2006.01)

(52) U.S. Cl.
  CPC ......... H04N 13/0221 (2013.01); H04N 13/04 (2013.01)

(56) References Cited

U.S. PATENT DOCUMENTS

| | | | |
|---|---|---|---|
| 7,161,616 B1* | 1/2007 | Okamoto | B60R 1/00 348/148 |
| 7,307,655 B1* | 12/2007 | Okamoto | G06K 9/00791 348/222.1 |
| 2002/0196962 A1 | 12/2002 | Fukuhara et al. | |
| 2005/0163343 A1* | 7/2005 | Kakinami | G06K 9/00812 382/103 |
| 2006/0238536 A1 | 10/2006 | Katayama et al. | |
| 2007/0003108 A1* | 1/2007 | Chinomi | B60R 1/00 382/104 |
| 2007/0057816 A1* | 3/2007 | Sakakibara | B62D 15/0275 340/932.2 |
| 2007/0239357 A1* | 10/2007 | Mori | B62D 15/027 701/469 |
| 2008/0136912 A1* | 6/2008 | Iwano | G06T 1/0007 348/148 |
| 2008/0309784 A1* | 12/2008 | Asari | B60R 1/00 348/222.1 |
| 2009/0073263 A1* | 3/2009 | Harada | B60R 1/00 348/148 |
| 2010/0060735 A1* | 3/2010 | Sato | B60R 1/00 348/148 |
| 2010/0066833 A1* | 3/2010 | Ohshima | B60R 1/00 348/148 |
| 2010/0201818 A1* | 8/2010 | Imanishi | B60R 1/00 348/148 |
| 2011/0185297 A1* | 7/2011 | Reid | G06F 3/04845 715/765 |

FOREIGN PATENT DOCUMENTS

| | | |
|---|---|---|
| JP | 3286306 | 5/2002 |
| JP | 2002-176641 | 6/2002 |
| WO | 2006/106685 | 10/2006 |

OTHER PUBLICATIONS

Ehlgen et al, "Manuevering Aid for Large Vehicles using Omnidirectional Cameras", WACV'07, 2007.*
International Search Report dated Jul. 12, 2011.

* cited by examiner

IMAGE GENERATION DEVICE AND OPERATION SUPPORT SYSTEM

CROSS-REFERENCE TO RELATED APPLICATIONS

The present application is a continuation of U.S. patent application Ser. No. 13/649,378, filed on Oct. 11, 2012, which is a continuation application filed under 35 U.S.C. 111(a) claiming benefit under 35 U.S.C. 120 and 365(c) of International Application PCT/JP2011/058899, filed on Apr. 8, 2011, designating the U.S., which claims priority to Japanese Patent Application No. 2010-091658, filed on Apr. 12, 2010. The disclosures of the prior applications are hereby incorporated herein in their entirety by reference.

FIELD

The present invention relates to an image generation device that generates an output image based on input images taken by image-taking means mounted on a body to be operated, which is capable of performing a turning operation, and an operation support system using the device.

BACKGROUND

There is known an image generation device that maps an input image from a camera on a predetermined space model on a three-dimensional space, and generates a visual point conversion image, which is viewed from an arbitrary virtual visual point in the three-dimensional space while referring to the mapped space data (for example, refer to Japanese Patent Publication No. 3286306).

The image generation device disclosed in Patent Document 1 projects an image taken by a camera mounted on a vehicle onto a three-dimensional space model configured by a plurality of plane surfaces or curved surfaces that surround the vehicle. The image generation device generates a visual point conversion image using the image projected onto the space model, and displays the produced visual point conversion image to a driver. The visual point conversion image is an image of a combination of a road surface image, which virtually reflects a state of a road taken from directly above, and a horizontal image, which reflects a horizontal direction image. Thereby, the image generation device relates, when the driver driving the vehicle looks the visual point conversion image, an object in the visual point conversion image to an object actually existing outside the vehicle without giving an uncomfortable feeling.

The image generation device disclosed in Patent Document 1 is assumed to be mounted on a vehicle, and is not supposed to be mounted on a body to be operated such as a construction machine capable to perform a turning operation. Accordingly, the image generation device disclosed in Patent Document 1 cannot generate a view point conversion image suitable for observing a surrounding area of a body to be operated during a turning operation.

SUMMARY

It is an object of the present invention to provide an image generation device, which generates an output image suitable for observing a surrounding area during a turning operation, and an operation support system using the device.

In order to achieve the above-mentioned objects, there is provided according to an aspect of the present invention an image generation device that generates an output image based on an image obtained by taking images by an image-taking part mounted to a body to be operated, which boy is capable of performing a turning operation, the image generation device including: a coordinates correspondence part configured to cause coordinates on a columnar space model, which is arranged to surround the body to be operated and has a center axis, to correspond to coordinates on an image plane on which the input image is positioned; and an output image generation part configured to generate the output image by causing values of the coordinates on the input image plane to correspond to values of the coordinates on an output image plane on which the output image is positioned through coordinates on the columnar space model, wherein the columnar space model is arranged so that an optical axis of the image-taking part intersects with the center axis of the columnar space model.

There is provided according to another aspect of the present invention an image generation device that generates an output image based on input images obtained by taking images by a plurality of image-taking parts mounted to a body to be operated, which body is capable of performing a turning operation, the image generation device including: a coordinates correspondence part configured to cause coordinates on a columnar space model, which is arranged to surround the body to be operated and has a center axis, to correspond to coordinates on an image plane on which the input image is positioned; and an output image generation part configured to generate the output image by causing values of the coordinates on the input image plane to correspond to values of the coordinates on an output image plane on which the output image is positioned through coordinates on the columnar space model, wherein the columnar space model is arranged so that each of components of a projection of optical axes of the image-taking parts on a plane perpendicular to the center axis intersects at a single point on the center axis of the columnar space model.

There is provided according to a further aspect of the present invention an operation support system that supports a movement or an operation of a body to be operated, including: the above-mentioned image generation device; and a display part configured to display the output image generated by the image generation device.

According to the present invention, it is possible to provide an image generation device, which generates an output image suitable for observing a surrounding area during a turning operation, and an operation support system using the device.

DESCRIPTION OF EMBODIMENT(S)

Hereafter, a description will be given, with reference to the drawings, of embodiments of the invention.

Figure 1:
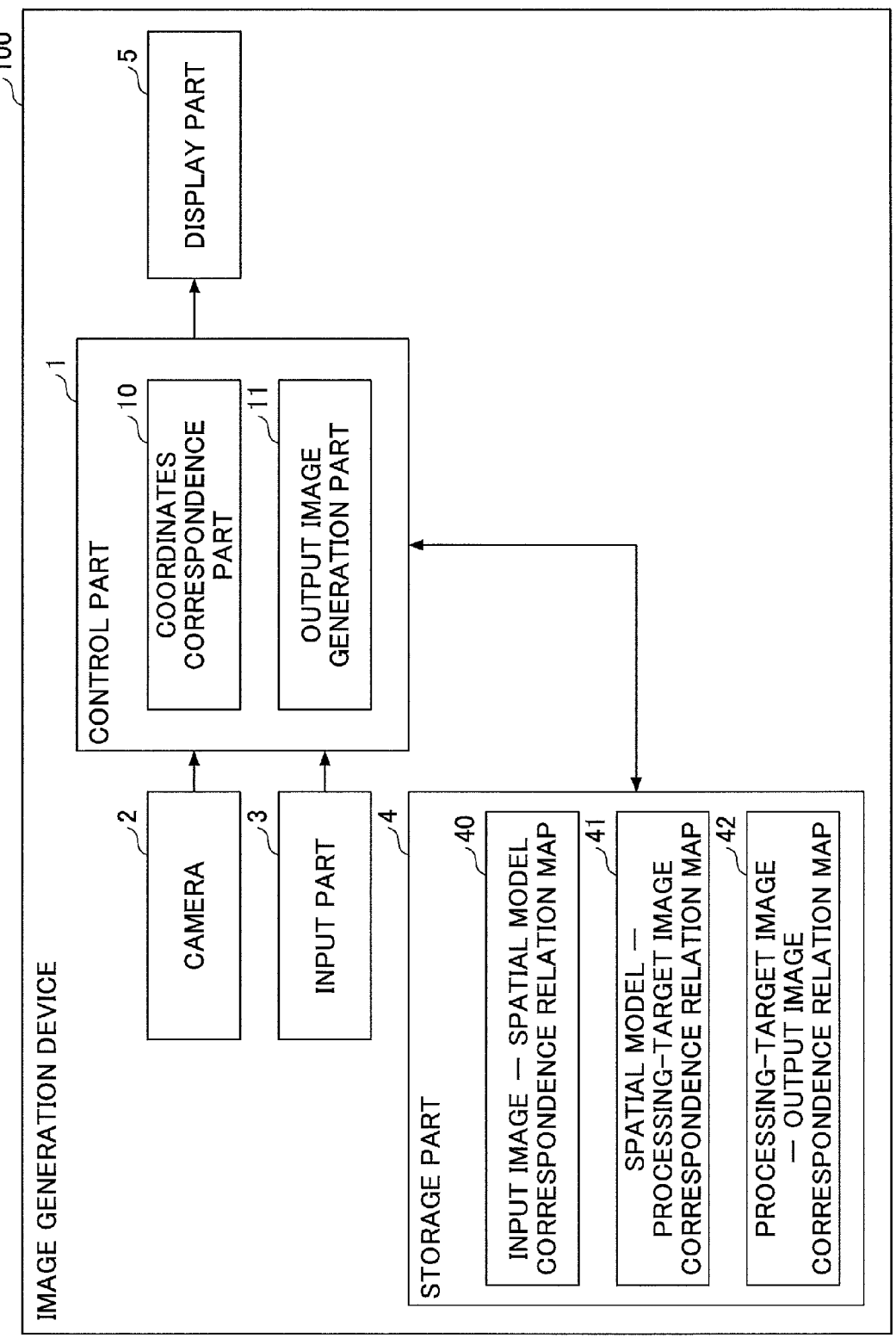
FIG. 1 is a block diagram illustrating an outline structure of an image generation device according to an embodiment of the present invention.

FIG. 1 is a block diagram illustrating an outline structure of an image generation device according to an embodiment of the present invention.

The image generation device 100 according to the embodiment generates, for example, an output image based on input images taken by a camera 2 mounted on a construction machine, and presents the output image to an operator. As illustrated in FIG. 1, the image generation device 100 includes a control part 1, the camera 2, an input part 3, a storage part 4 and a display part 5.

Figure 2:
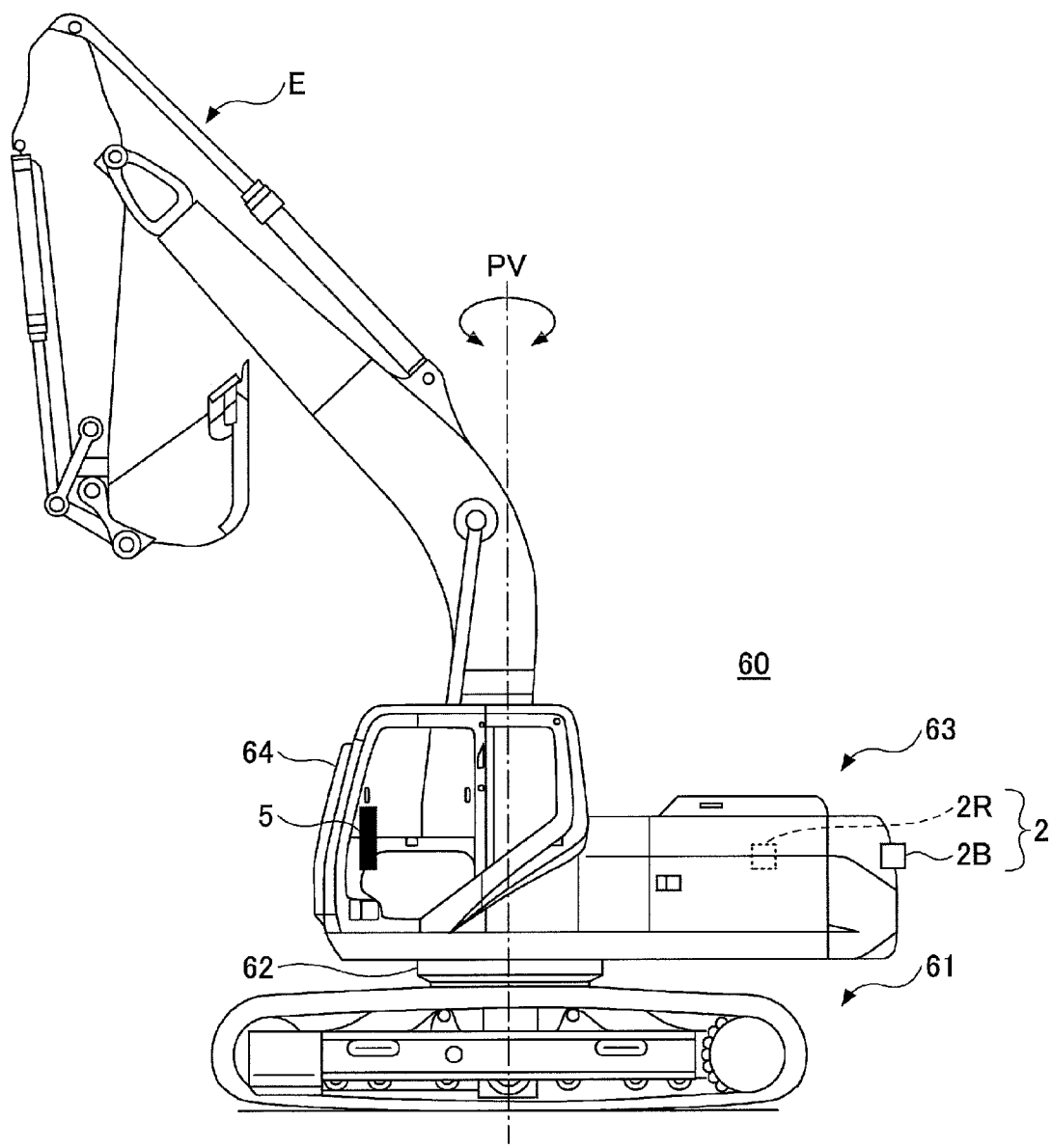
FIG. 2 is a side view of a shovel to which the image generation device is mounted.

FIG. 2 is a side view of an excavator 60 to which the image generation device is mounted. The excavator 60 includes a lower-part running body 61 of a crawler type, a turning mechanism 61 and an upper-part turning body 63. The upper-part turning body 63 is mounted on the lower-part running body 61 via the turning mechanism 62 so as to be turnable about a tuning axis PV.

A cab (driver's cabin) 64 is provided on a front left side part of the upper-part turning body 63, and an excavation attachment E is provided on a front central part. The cameras 2 (a right side camera 2R and a backside camera 2B) are provided on a right side surface and a rear surface of the upper-part turning body 63. The display part 5 is installed in the cab 64 at a position where the display part 5 can be easily viewed by an operator.

Next, a description is given of each structural element of the image generation device 100.

The control part 1 includes a computer provided with a CPU (Central Processing Unit), a RAM (Random Access Memory), a ROM (Read Only Memory), an NVRAM (Non-Volatile Random Access Memory), etc. For example, programs corresponding to each of a coordinates correspondence part 10 and an output image generation part 11 mentioned later are stored in the ROM or the NVRAM. The CPU performs processing by executing a program corresponding to each means while using the RAM as a temporary storage area.

The camera 2 is a device for acquiring an input image which projects a circumference of the excavator 60, and includes a right side camera 2R and a backside camera 2B. The right side camera 2R and the backside camera 2B are attached to the right side surface and the rear surface of the upper-part turning body 63 so that, for example, an image of an area of a dead zone to the operator can be taken (refer to FIG. 2). Each of the right side camera 2R and the backside camera 2B is equipped with an image pick-up device, such as a CCD (Charge Coupled Device), a CMOS (Complementary Metal Oxide Semiconductor), etc. In addition, the camera 2 may be attached at positions (for example, a front surface and a left side surface) other than the right side surface and the rear surface of the upper-part turning body 63, and may be equipped with a wide-angle lens or a fish-eye lens so that an image of a large range can be taken.

The camera 2 acquires an input image according to a control signal from the control part 1, and outputs the acquired input image to the control part 1. In addition, when the camera 2 acquires the input image using a fish-eye lens or a wide-angle lens, the camera 2 output a corrected input image to the control part 1 in which an apparent distortion or tilting, which is caused by usage of those lenses, is corrected. However, the camera 2 may output the acquired input image as it is without correction. In such a case, the control part corrects an apparent distortion and tilting.

The input part 3 is a device for an operator to enable an input of various kinds of information to the image generation device 100, and includes, for example, a touch panel, a button switch, a pointing device, a keyboard, etc.

The storage part 4 is a device for storing various kinds of information, and includes, for example, a hard disk, an optical disk, a semiconductor memory, etc.

The display part 5 is a device for displaying image information, and includes, for example, a liquid crystal display or a projector, which is installed in the cab 64 (refer to FIG. 2) of the construction machine. The display part 5 displays various images which the control part 1 outputs.

Moreover, the image generation device 100 may generate a processing-target image based on an input image, and may display an output image after generating the output image by applying an image conversion process to the processing-target image so that the output image enables intuitive perception of a positional relationship with a peripheral obstacle and a distance sense, and may present the output image to the operator.

The "processing-target image" is generated based on an input image and to be subjected to an image conversion process (for example, a scale conversion, an affine conversion, a distortion conversion, a viewpoint conversion processing). For example, an input image, which is an input image taken by a camera that takes an image of a ground surface from above and contains an image (for example, an empty part) in a horizontal direction according to a wide view angle, is used in an image conversion process. In such a case, the input image is projected onto a predetermined space model so that a horizontal image thereof is not displayed unnaturally (for example, is not handled as an empty part on a ground surface). Then, an image suitable for the image conversion process can be obtained by re-projecting a projection image projected on the space model onto a different two-dimensional plane. It should be noted that the processing-target image may be used as an output image as it is without applying an image conversion process.

The "space model" is a target object on which an input image is projected, and includes at least a plane surface or a curved surface (for example, a plane surface parallel to the processing-target image plane or a plane surface or curved surface that forms an angle with the processing-target image plane) other than a processing-target image plane, which is a plane surface on which the processing-target image is positioned.

It should be noted that the image generation device 100 may generates an output image by applying an image conversion process to a projection image projected onto the space model without generating a processing-target image. Moreover, the projection image may be used as an output image as it is without being subjected to an image conversion process.

Figure 3A:
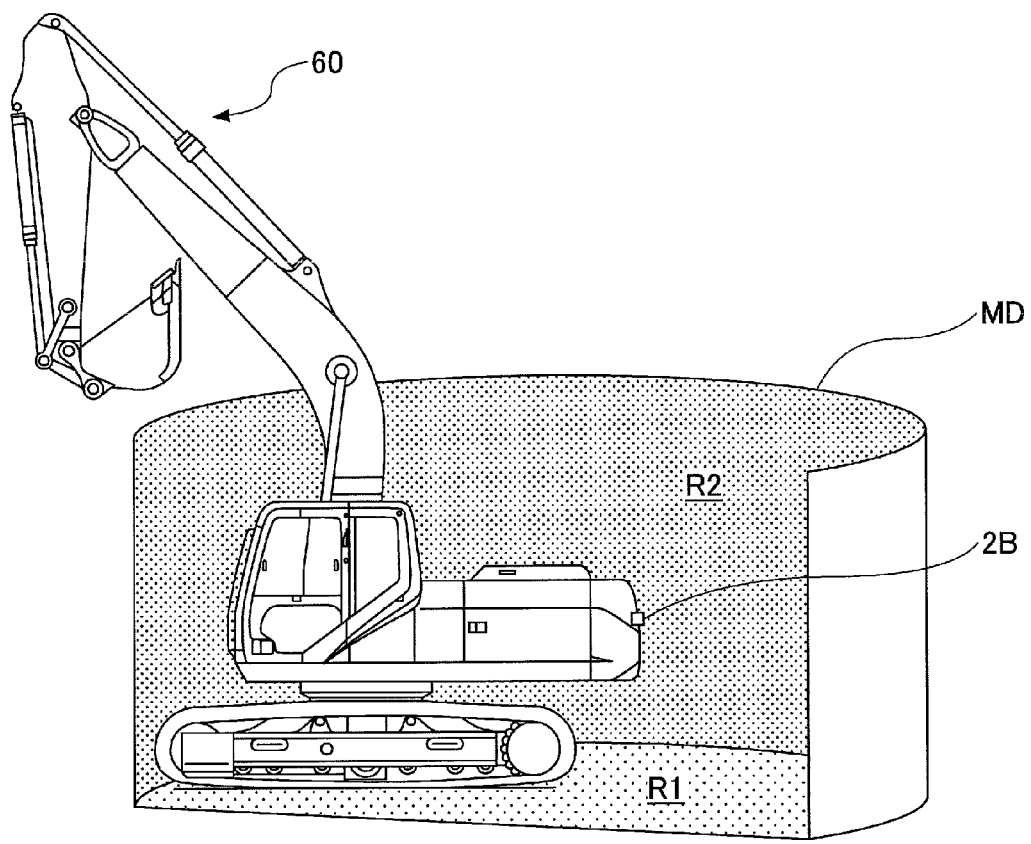
FIG. 3A is a side view of a space model to which an input image is projected.
Figure 3B:
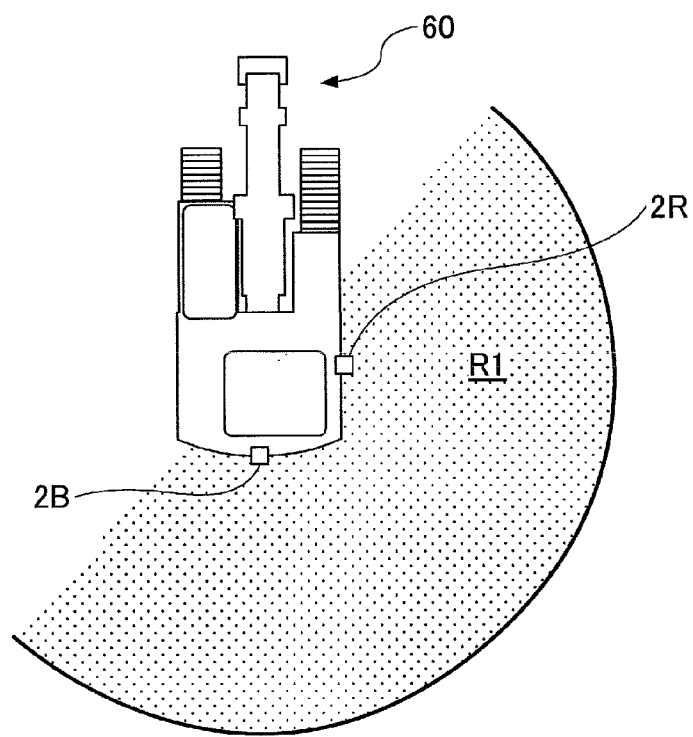
FIG. 3B is a plan view of the space model illustrated in FIG. 3A.

FIGS. 3A and 3B are views illustrating an example of a space model MD on which an input image is projected. FIG. 3A illustrates a relationship between the excavator 60 and the space model MD when viewing the excavator 60 from a side, and FIG. 3B illustrates a relationship between the excavator 60 and the space model. MD when viewing the excavator 60 from above.

As illustrated in FIGS. 3A and 3B, the space model MD has a half-cylindrical form. An inner part of a bottom surface of the half-cylindrical form includes a plane surface area R1, and an inner part of a side surface includes a curved surface area R2.

Figure 4:
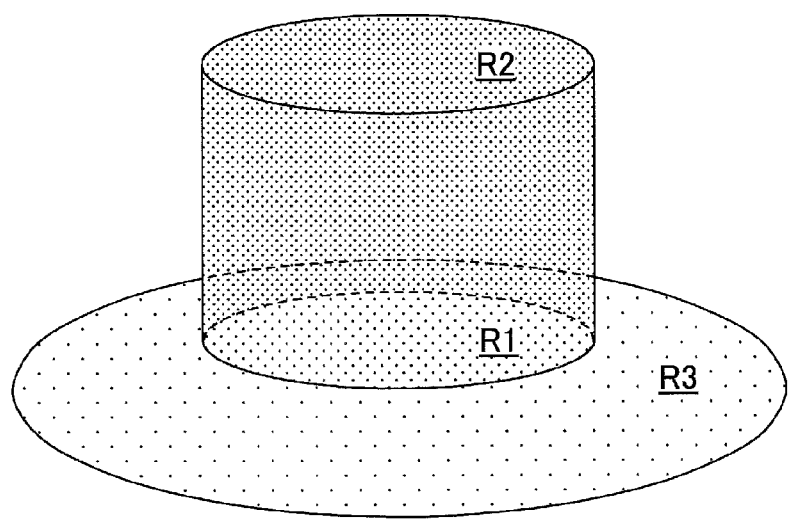
FIG. 4 is a perspective view illustrating a relationship between the space model and an image plane to be processed.

FIG. 4 is a view illustrating an example of a relationship between the space model MD and the processing-target image plane. In FIG. 4, the processing-target image plane R3 is a plane containing the plane surface area R1 of the space model MD. It should be noted that although the space model MD is illustrated as a cylindrical form, which is different from the half-cylindrical form as illustrated in FIG. 3, for the purpose of clarification in FIG. 4, the space model MD may be either of the half-cylindrical form and the cylindrical form. The same applies in figures mentioned below. Additionally, the processing-target image plane R3 may be a circular area, which contains the plane surface area R1 of the space model MD, or may be an annular area, which does not contain the plane surface area R1 of the space model MD.

Next, a description is given of the coordinates correspondence part 10 and the output image generation part that the control part 1 includes.

The coordinates correspondence part 10 is provided for causing the coordinates on the input image plane on which the input image taken by the camera 2 is positioned (may be referred to as input coordinates), the coordinates on the space model MD (may be referred to as spatial coordinates, and the coordinates on the processing-target image plane R3 (may be referred to as projection coordinates) to correspond to each other. For example, the coordinates on the output image plane, the coordinates on the space model MD and the coordinates on the processing-target image plane R3 are caused to correspond to each other based on various parameters with respect to the camera 2, such as an optical center, a focal distance, a CCD size, an optical axis direction vector, a camera horizontal direction vector, a projection system, etc., of the camera 2, which are input through the input part 3 and a previously determined positional relationship between the input image plane, the space model MD and the processing-target image plane R3. The correspondence relationship is stored in the input image—space model correspondence relation map 40 and the space model—processing-target image correspondence relation map 41 of the storage part 4.

It should be noted that the coordinates correspondence part 10 omits causing correspondence between the coordinates on the space model MD and the coordinates on the processing-target image plane R3 and storage of the correspondence relationship in the space model—processing-target image correspondence relation map 41.

The output image generation part 11 generates an output image. The output image generation part 11 causes the coordinates on the processing-target image plane R3 and the coordinates on the output image plane on which the output image is positioned to correspond to each other by applying, for example, a scale conversion, an affine conversion, or a distortion conversion to the processing-target image. The correspondence relationship is stored in the processing-target image—output image correspondence relation map 42 of the storage part 4. The output image generation part 11 generates an output image by relating a value of each pixel in the output mage (for example, a brightness value, a color phase value, a chroma value, etc.) to a value of each pixel in the input image while referring to the input image—space model correspondence relation map 40 and the space model—processing-target image correspondence relation map 41 stored in the coordinates correspondence part 10.

Moreover, the output image generation part 11 causes the coordinates on the processing-target image plane R3 and the coordinates on the output image plane on which the output image is positioned to correspond to each other based on various parameters, such as an optical center, a focal distance, a CCD size, an optical direction axis vector, a camera horizontal direction vector, a projection system, etc., of a virtual camera that are input through the input part 3. The correspondence relationship is stored in the processing-target image—output image correspondence relation map 42 of the storage part 4. Then, the output image generation part 11 generates an output image by relating a value of each pixel in the output image (for example, a brightness value, a color phase value, a chroma value, etc.) to a value of each pixel in the input image while referring to the input image—space model correspondence relation map 40 and the space model—processing-target image correspondence relation map 41 stored in the coordinates correspondence part 10.

It should be noted that the output image generation part 11 may generate the output image by changing a scale of the processing-target image without using a concept of virtual camera.

Moreover, when the output image generation part 11 does not generate the processing-target image, the output image generation part 11 causes the coordinates on the space model MD and the coordinates on the output image plane to correspond to each other in accordance with the image conversion process applied. Then, the output image generation part 11 generates the output image by relating a value of each pixel in the output image (for example, a brightness value, a color phase value, a chroma value, etc.) to a value of each pixel in the input image while referring to the input image—space model correspondence relation map 40. In this case, the output image generation part 11 omits the causing correspondence between the coordinates on the processing-target image plane R3 and the coordinates on the output image plane and storage of the correspondence relationship in the processing-target image—output image correspondence relation map 42.

Next, a description is given of an example of a process performed by the coordinates correspondence part 10 and the output image generation part 11.

The coordinates correspondence part 10 can cause the input coordinates on the input image plane correspond to the spatial coordinates on the space model by using the Hamilton's quaternion.

Figure 5:
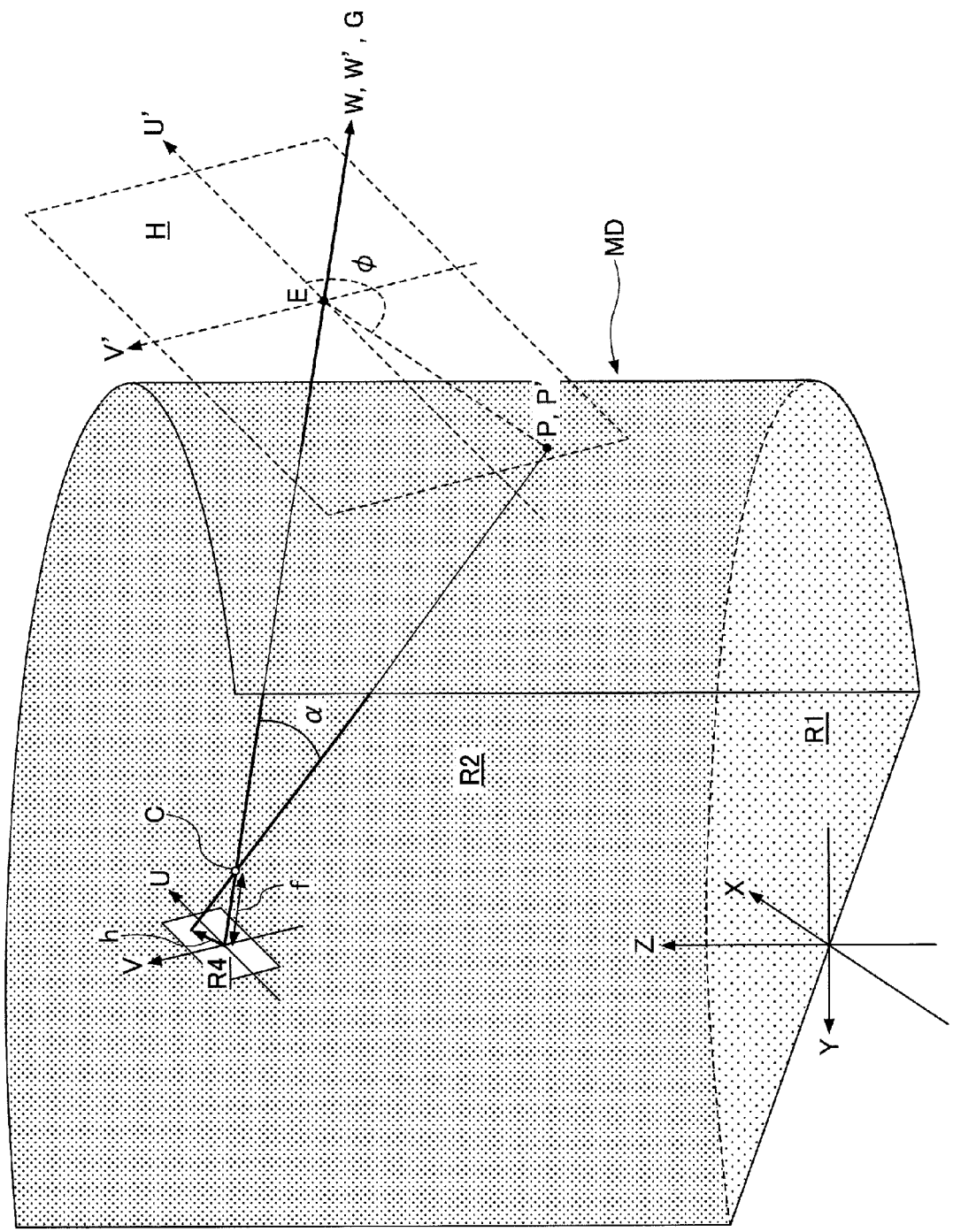
FIG. 5 is a diagram for explaining a correspondence between coordinates on an input image plane and coordinates on a space model.

FIG. 5 is a view for explaining a correspondence between the coordinates on the input image plane and the coordinates on the space model. The input image plane of the camera 2 is expressed as a single plane having an optical center C of the camera 2 as an original point in a UVW rectangular coordinates system, and the space model is expressed as cubic planes in an XYZ rectangular coordinates system.

First, in order to convert the coordinates (coordinates of an XYZ coordinate system) on the space model into the coordinates (coordinates on the UVW coordinates system) on the input image plane, the XYZ coordinates system is rotated to cause the X-axis to be coincident with the U-axis, the Y-Axis to be coincident with the V-axis and the Z-axis to be coincident with −W-axis after parallel-moving the original point of the XYZ coordinates system to the optical center C (original point of the UVW coordinates system). Here, the sign "−" means that a direction is opposite. This is caused by ahead of a camera is set to a +W direction in the UVW coordinates system, and a vertical downward direction is set to a −Z direction in the XYZ coordinates system.

If there are a plurality of cameras 2, each of the cameras 2 has an individual UVW coordinates system. Thereby, the coordinates correspondence part 10 translates and rotates the XYZ coordinates system with respect to each of the plurality of UVW coordinates system.

The above-mentioned conversion is realized by translating the XYZ coordinates system so that the optical center C of the camera 2 becomes the original point of the XYZ coordinates system, and, thereafter, rotating the XYZ coordinates system so that the X-axis is coincident with the −W-axis and further rotating the XYZ coordinates system so that the X-axis is coincident with the U-axis. Therefore, the coordinates correspondence part 10 integrates the two rotations into a single rotation operation by describing the conversion by the Hamilton's quaternion.

By the way, a rotation to cause a certain vector A to be in coincident with a different vector B corresponds to a process of rotating by an angle formed between the vector A and the vector B using a normal line of a plane defined by the vector A and the vector B. When the rotating angle is set to θ, the angle θ is expressed by an inner product of the vector A and the vector B as follows.

$$\theta = \cos^{-1}\left(\frac{A \cdot B}{|A||B|}\right) \qquad \text{[Formula 1]}$$

Moreover, the unit vector N of the normal line of the plane defined by the vector A and the vector B is expressed by an outer product of the vector A and the vector B as follows.

$$N = \frac{A \times B}{|A||B|\sin\theta} \qquad \text{[Formula 2]}$$

It should be noted that when i, j and k are imaginary number unit, the quaternion is a hypercomplex number satisfying the following condition.

$$ii=jj=kk=ijk=-1 \qquad \text{[Formula 3]}$$

In the present embodiment, the quaternion Q is expressed as follows, where a real component is t and pure imaginary components are a, b and c.

$$Q=(t;a,b,c)=t+ai+bj+ck \qquad \text{[Formula 4]}$$

Therefore, the conjugate quaternion of the quaternion Q is expressed as follows.

$$Q^*=(t;-a,-b,-c)=t-ai-bj-ck \qquad \text{[Formula 5]}$$

The quaternion Q can express a three-dimensional vector (a, b, c) by the pure imaginary components a, b and c while setting the real component t to 0 (zero). In addition, a rotating operation with an arbitrary vector as an axis can be expressed by each component t, a, b and c.

Further, the quaternion Q can express the consecutive plurality of numbers of rotating operation as a single rotation by integrating the rotating operations. For example, a point D (ex, ey, ez), which is an arbitrary point S (sx, sy, sz) rotated by an angle θ with an arbitrary unit vector C (l, m, n) as an axis, can be expressed as follows.

$$D = (0; ex, ey, ez) = QSQ^* \qquad \text{[Formula 6]}$$

where, $$S = (0; sx, sy, sz), Q = \left(\cos\frac{\theta}{2}; l\sin\frac{\theta}{2}, m\sin\frac{\theta}{2}, n\sin\frac{\theta}{2}\right)$$

Here, in the present embodiment, when the quaternion expressing a rotation, which causes the Z-axis to be coincident with the −W-axis, is $Q_z$, the point X on the X-axis in the XYZ coordinates system is moved to a point X'. Therefore, the point X' is expressed as follows.

$$X' = Q_z X Q_z^*$$ [Formula 7]

Moreover, in the present embodiment, when the quaternion expressing a rotation, which causes a line connecting the point X' on the X-axis and the original point to be coincident with the U-axis is $Q_x$, the quaternion R expressing a rotation to cause the Z-axis to be coincident with the −W-axis and further cause the X-axis to be coincident with the U-axis is expressed as follows.

$$R = Q_x Q_z$$ [Formula 8]

As mentioned above, the coordinates P', when arbitrary coordinates P on the space model (XYZ coordinates system) is expressed by the coordinates on the input image plane (UVW coordinates system), is expressed as follows.

$$P' = RPR^*$$ [Formula 9]

Because the quaternion R is a constant of each of the cameras 2, the coordinates correspondence part 10 can convert the coordinates on the space model (XYZ coordinates system) into the coordinates on the input image plane (UVW coordinates system) by merely performing the operation.

After converting the coordinates on the space model (XYZ coordinates system) into the coordinates on the input image plane (UVW coordinates system), the coordinates correspondence part 10 computes an incident angle α formed by a line segment CP' connecting the optical center C (coordinates on the UVW coordinates system) of the camera 2 and coordinates P', which is arbitrary coordinates P on the space model expressed by the UVW coordinates system, and the optical axis G of the camera 2.

Moreover, the coordinates correspondence part 10 computes an argument φ and a length of a line segment EP', the argument φ being formed by the line segment EP', which connects the coordinates P' and an intersecting point E of a plane H and an optical axis G in the plane H, which is parallel to the input image plane R4 (for example, a CCD surface) and containing the coordinates P', and a U'-axis in the plane H.

In an optical system of a camera, normally, an image height h is a function of an incident angle α and a focal distance f. Accordingly, the coordinate correspondence part 10 computes the image height h by selecting an appropriate projection system such as a normal projection (h=f tan α), an orthogonal projection (h=f sin α), a stereographic projection (h=2f tan(α/2)), an equisolid angle projection (h=f sin(α/2)), an equidistant projection (h=fα), etc.

Thereafter, the coordinates correspondence part 10 decomposes the image height h to a U-component and a V-component on the UV coordinates system according to an argument φ, and divide them by a numerical value corresponding to a pixel size per one pixel of the input image plane R4. Thereby, the coordinates correspondence part 10 can cause the coordinates P (P') on the space model MD and the coordinates on the input image plane R4.

It should be noted that when the pixel size per one pixel in the U-axis direction of the input image plane R4 is set to au, and the pixel size per one pixel in the V-axis direction of the input image plane R4 is set to av, the coordinates (u, v) on the input image plane R4 corresponding to the coordinates P (P') on the space model MD is expressed as follows.

$$u = \frac{h\cos\varphi}{a_U}$$ [Formula 10]

$$v = \frac{h\sin\varphi}{a_V}$$ [Formula 11]

As mentioned above, the coordinates correspondence part 10 causes the coordinates on the space model MD to correspond to the coordinates on one or more input image planes R4 existing for each camera, and relates the coordinates on the space model MD, a camera identifier, and the coordinates on the input image plane R4, and stores the correspondence relationship in the input image—space model correspondence relation map 40.

Because the coordinates correspondence part 10 operates the conversion of coordinates by using the quaternion, the coordinates correspondence part 10 provides an advantage in that a gimbal lock is not generated unlike a case where a conversion of coordinates is operated using an Euler angle. However, the coordinate correspondence part 10 is not limited to one performing an operation of conversion of coordinates using a quaternion, and the conversion of coordinates may be operated using an Euler angle.

If it is possible to cause a correspondence to coordinates on a plurality of input image planes R4, the coordinates correspondence part 10 may cause the coordinates P (P') to correspond to the coordinates on the input image plane R4 with respect to a camera of which incident angle is smallest, or may cause the coordinates P (P') to correspond to the coordinates on the input image plane R4 selected by an operator.

Next, a description is given of a process of re-projecting the coordinates on the curved surface area R2, from among the coordinates on the space model MD, onto the processing-target image plane R3 on the XY plane.

Figure 6A:
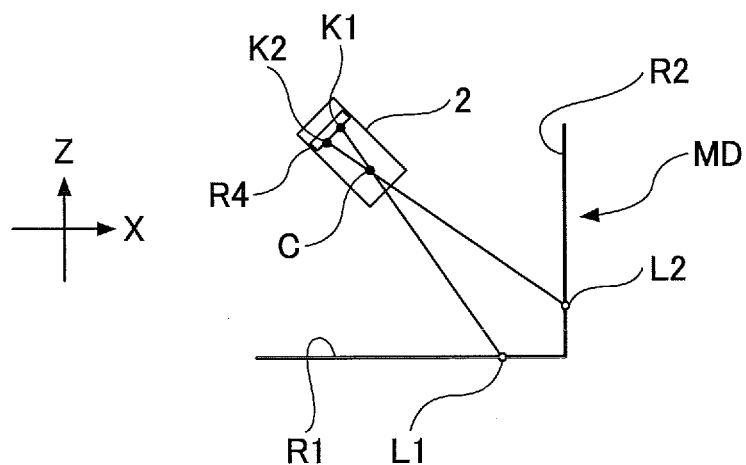
FIG. 6A is a diagram illustrating a correspondence relationship between coordinates on an input image plane of a camera using a normal projection and coordinates on a space model MD.
Figure 6B:
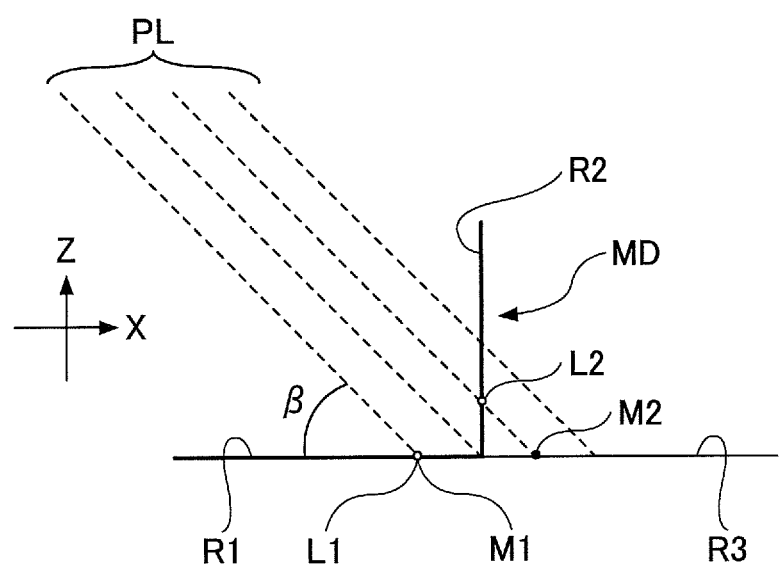
FIG. 6B is a diagram illustrating a correspondence relationship between coordinates on a curved surface area of the space model MD and coordinates on an image plane to be processed.

FIGS. 6A and 6B are views for explaining correspondence between coordinates according to the coordinates correspondence part 10. FIG. 6A is a view illustrating a correspondence relationship between the coordinates on the input mage plane R4 of the camera 2 using a normal projection (h=f tan α) and the coordinates on the space model MD. The coordinates correspondence part 10 causes both coordinates to correspond to each other by causing each of line segments, which connect coordinates on the input image plane R4 of the camera 2 and the coordinates on the space model MD corresponding to the coordinates on the input image plane R4, passes the optical center C of the camera 2.

In the example illustrated in FIG. 6A, the coordinates correspondence part 10 causes the coordinates K1 on the input image plane R4 of the camera 2 to correspond to the coordinates L1 on the plane surface area R1 of the space model MD, and causes the coordinates K2 on the input image plane R4 of the camera 2 to correspond to the coordinates L2 on the curved surface area R2 of the space model MD. In this situation, both the line segment K1-L1 and the line segment K2-L2 pass the optical center C of the camera 2.

It should be noted that when the camera 2 uses projection systems (for example, an orthogonal projection, a stereographic projection, an equisolid angle projection, an equidistant projection, etc.) other than the normal projection system, the coordinates correspondence part 10 causes the coordinates K1 and K2 on the input image plane R4 to correspond to the coordinates L1 and L2 on the space model MD according to the respective projection system.

Specifically, the coordinates correspondence part 10 causes the coordinates on the input image plane to correspond to the coordinates on the space model MD based on a predetermined function (for example, an orthogonal projection (h=f sin α), a stereographic projection (h=2f tan(α/2)), an equisolid angle projection (h=f sin(α/2)), an equidistant projection (h=fα), etc.). In this case, the line segment K1-L1 and the line segment K2-L2 do not pass the optical center C of the camera 2.

FIG. 6B is a view illustrating a correspondence relationship between the coordinates on the curved surface area R2 of the space model MD and the coordinates on the processing-target image plane R3. The coordinates correspondence part 10 introduces a group of parallel lines PL, which are a group of parallel lines PL positioned on the XZ-plane and form an angle β between the processing-target image plane R3, and causes both coordinates to correspond to each other so that both the coordinates on the curved surface area R2 of the space model MD and the coordinates on the processing-target image plane R3 corresponding to the coordinates on the curved surface area R2 are positioned on one of the parallel lines.

In the example illustrated in FIG. 6B, the coordinates correspondence part 10 causes both coordinates to correspond to each other so that the coordinates L2 on the curved surface area R2 of the space model MD and the coordinates M2 on the processing-target image plane R3 are positioned on a common parallel line.

The coordinates correspondence part 10 can cause the coordinates on the plane surface area R1 of the space model MD to correspond to the coordinates on the processing-target image plane R3 using a group of parallel lines PL, similar to the coordinates on the curved surface area R2. However, in the example illustrated in FIG. 6B, because the plane surface area R1 and the processing-target image plane R3 lie in a common plane, the coordinates L1 on the plane surface area R1 on the space model MD and the coordinates M1 on the processing-target image plane R3 have the same coordinates value.

As mentioned above, the coordinates correspondence part 10 causes the spatial coordinates on the space model MD to correspond to the projection coordinates on the processing-target image plane R3, and stores the coordinates on the space model MD and the coordinates on the processing-target image R3 in the space model—processing-target image correspondence relation map 41 by relating them to each other.

Figure 6C:
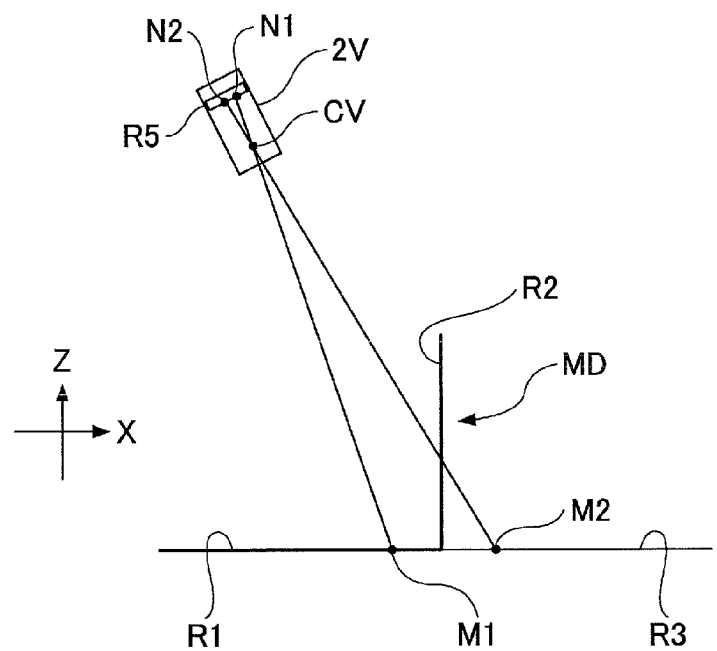
FIG. 6C is a diagram illustrating a correspondence relationship between coordinates on the image plane to be processed and coordinates on output image plane of a virtual camera using a normal projection.

FIG. 6C is a view illustrating a correspondence relationship between the coordinates on the processing-target image plane R3 and the coordinates on the output image plane R5 of the virtual camera 2V using, as an example, a normal projection (h=f tan α). The coordinates correspondence part 10 causes both coordinates to correspond to each other so that each of line segments connecting the coordinates on the output image plane R5 of the virtual camera 2V and the coordinates on the processing-target image plane R3 corresponding to the coordinates on the output image plane R5 passes the optical center CV of the virtual camera 2V.

In the example illustrated in FIG. 6C, the output image generation part 11 causes the coordinates N1 on the output image plane R5 of the virtual camera 2V to correspond to the coordinates M1 on the processing-target image plane R3 (the plane surface area R1 of the space model MD), and causes the coordinates N2 on the output image plane R5 of the virtual camera 2V to correspond to the coordinates M2 on the processing-target image plane R3. In this situation, both the line segment M1-N1 and the line segment M2-N2 pass the optical center CV of the virtual camera 2.

If the virtual camera 2 uses projection systems (for example, an orthogonal projection, a stereographic projection, an equisolid angle projection, an equidistant projection, etc.) other than the normal projection, the output image generation part 11 causes the coordinates N1 and N2 on the output image plane R5 of the virtual camera 2V to correspond to the coordinates M1 and M2 on the processing-target image plane R3 according to the respective projection system.

Specifically, the output image generation part 11 causes the coordinates on the output image plane R5 to correspond to the coordinates on the processing-target image plane R3 based on a predetermined function (for example, an orthogonal projection (h=f sin α), a stereographic projection (h=2f tan(α/2)), an equisolid angle projection (h=f sin (α/2)), an equidistant projection (h=fα), etc.). In this case, the line segment M1-N1 and the line segment M2-N2 do not pass the optical center CV of the virtual camera 2V.

As mentioned above, the output image generation part 11 causes the coordinates on the output image plane R5 to correspond to the coordinates on the processing-target image plane R3, and stores the coordinates on the output image plane R5 and the coordinates on the processing-target image R3 in the processing-target image—output image correspondence relation map 42 by relating them to each other. Then, the output image generation part 11 generates the output image be relating a value of each pixel in the output image to a value of each pixel in the input image while referring to the input image—space model correspondence relation map 40 and the space model—processing-target image correspondence relation map 41 stored in the coordinates correspondence part 10.

Figure 6D:
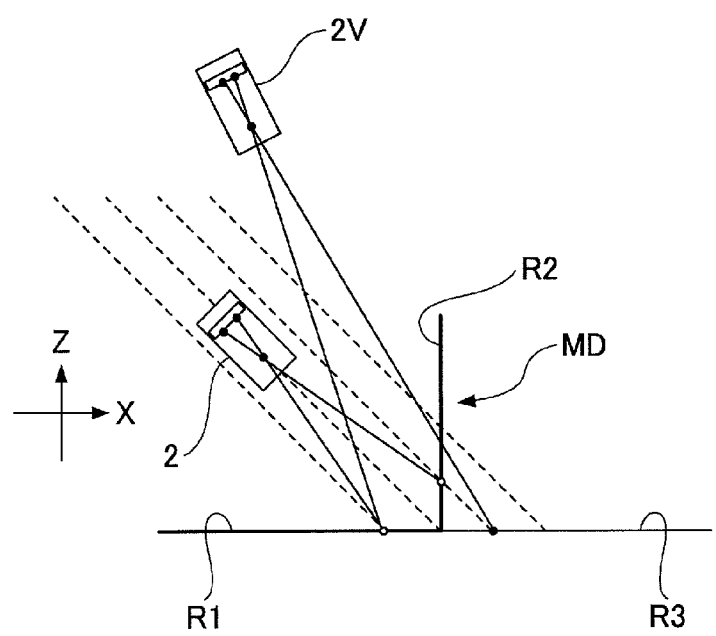
FIG. 6D is a diagram illustrating a mutual positional relationship between the camera, the virtual camera, the plane surface area and the curved surface area of the space model MD and the image plane to be processed.

It should be noted that FIG. 6D is a view of combination of FIG. 6A through FIG. 6C, and illustrates a mutual positional relationship between the camera 2, the virtual camera 2V, the plane surface area R1 and the curved surface area R2 of the space model MD, and the processing-target image plane R3.

Figure 7A:
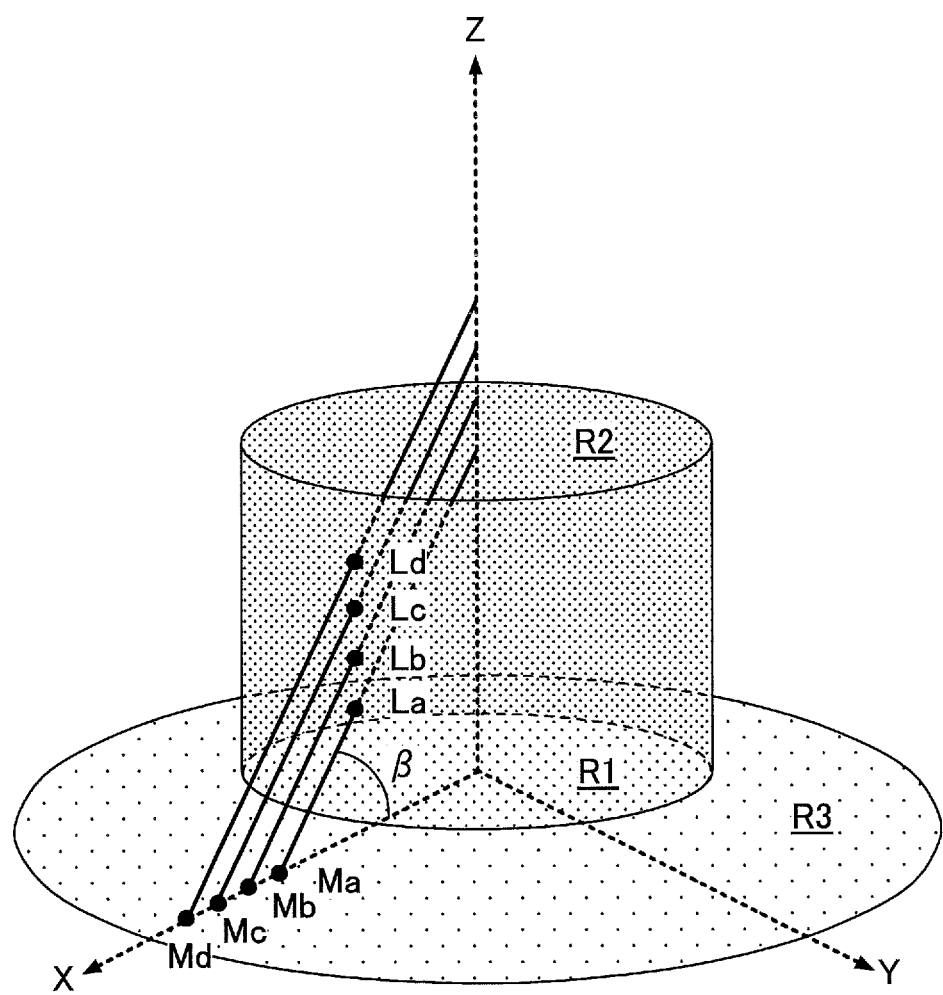
FIG. 7A is a view illustrating a state where an angle β is formed between a group of parallel lines positioned on an XZ-plane and a processing-target image plane.
Figure 7B:
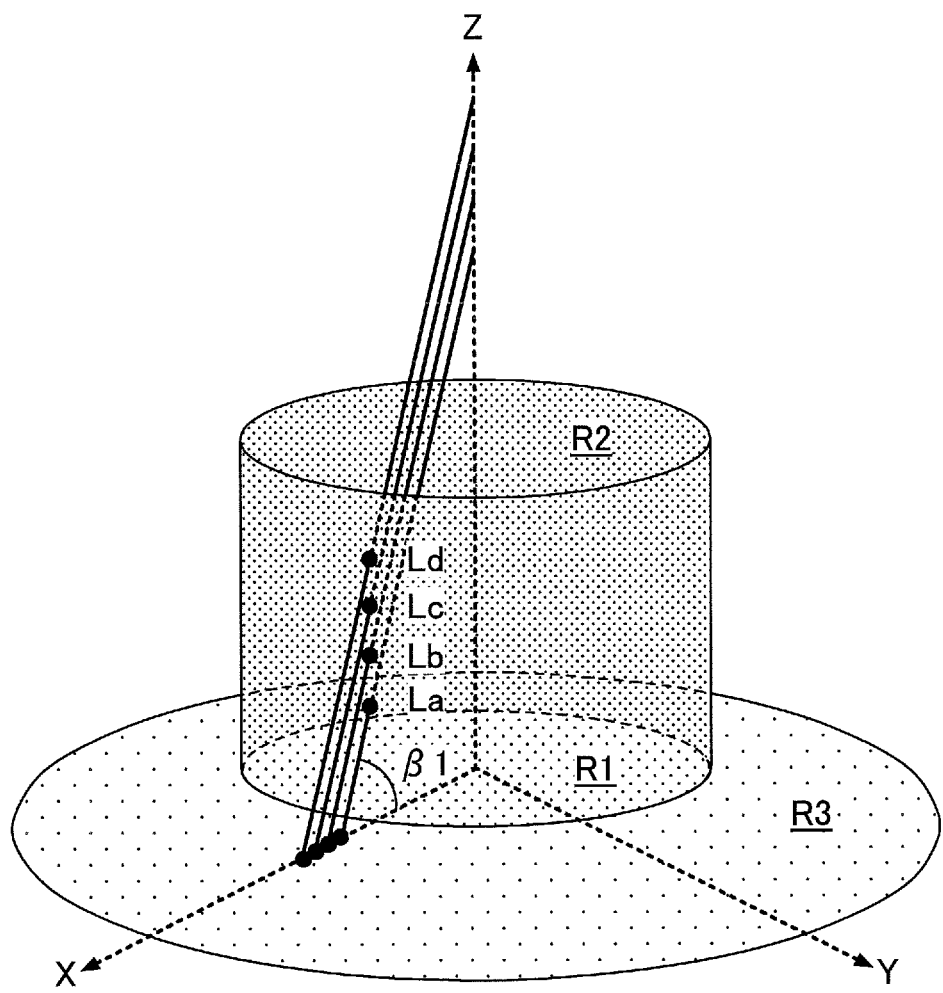
FIG. 7B is a view illustrating a state where an angle β1 is formed between a group of parallel lines positioned on the XZ-plane and a processing-target image plane.

Next, a description is given, with reference to FIGS. 7A and 7B, of an action of the group of parallel lines, which the coordinates correspondence part 10 introduces to cause the coordinates on the space model MD to correspond to the coordinates on the processing-target image plane R3.

FIG. 7A is a view of a case where an angle β is formed between the group of parallel lines PL positioned on the XZ-plane and the processing-target image plane R3. FIG. 7B is a view of a case where an angle β1 (β1>β) is formed between the group of parallel lines PL positioned on the XZ-plane and the processing-target image plane R3. The coordinates La through Ld on the curved surface area R2 of the space model MD in FIGS. 7A and 7B correspond to the coordinates Ma through Md on the processing-target image plane R3, respectively. The intervals of the coordinates La through Ld in FIG. 7A are equal to the intervals of the coordinates La through L4 in FIG. 7B, respectively. It should be noted that although the group of parallel lines PL are supposed to be on the XZ-plane for the purpose of simplification of description, actually, the parallel lines radially extend from all points on the Z-axis toward the processing-target image plane R3. The Z-axis in this case is referred to as "re-projection axis".

As illustrated in FIGS. 7A and 7B, the intervals of the coordinates Ma through Md on the processing-target image plane R3 decease linearly as the angle between the group of parallel lines PL and processing-target image plane R3 increases. That is, the intervals of the coordinates Ma through Md decrease uniformly irrespective of the distance between the curved surface area R2 of the space model MD and each of the coordinates Ma through Md. On the other hand, in the example illustrated in FIGS. 7A and 7B, because a conversion to the group of coordinates on the processing-target image plane R3 is not performed, the intervals of the group of coordinates on the plane surface area R1 of the space model MD do not change.

The change in the intervals of the group of coordinates means that only an image portion corresponding to the image projected on the curved surface area R2 of the space model MD from among the image portions on the output image plane R5 (refer to FIG. 6C) is enlarged or reduced linearly.

Figure 8A:
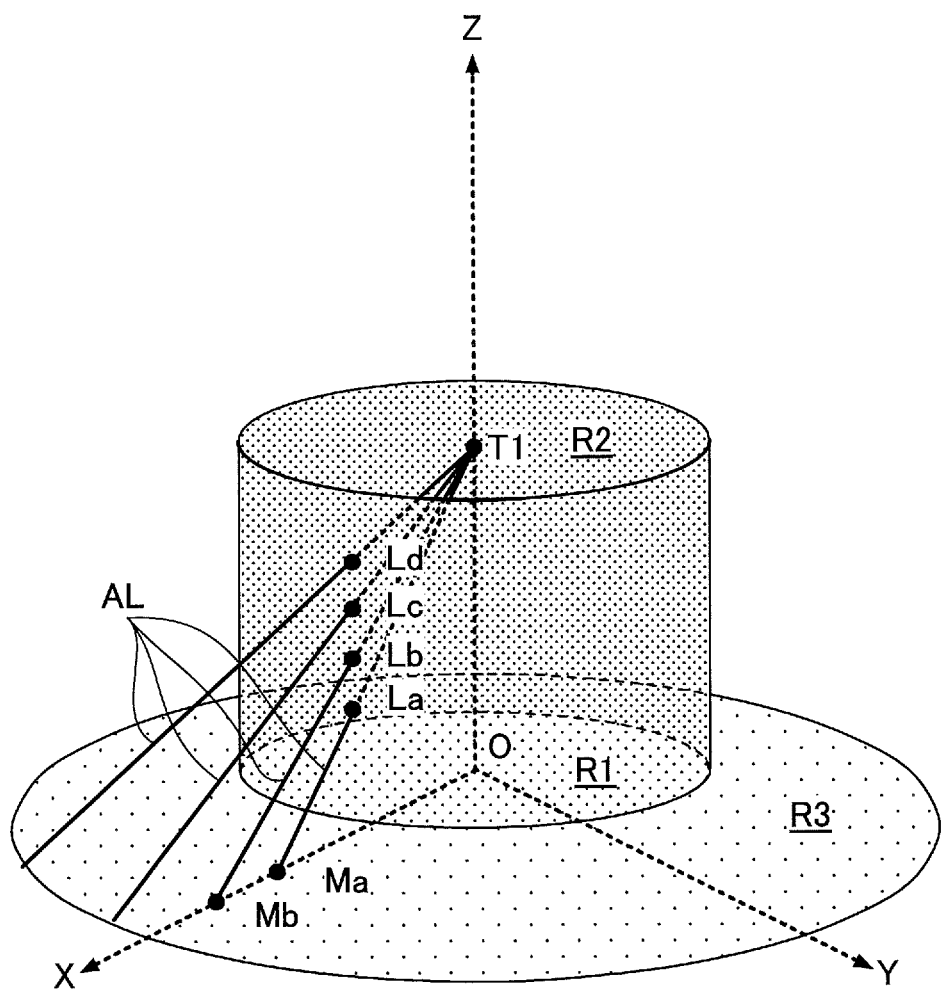
FIG. 8A is a view illustrating a state where all of a group of auxiliary lines positioned on the XZ-plane extend from a start point on a Z-axis toward the processing-target image plane.
Figure 8B:
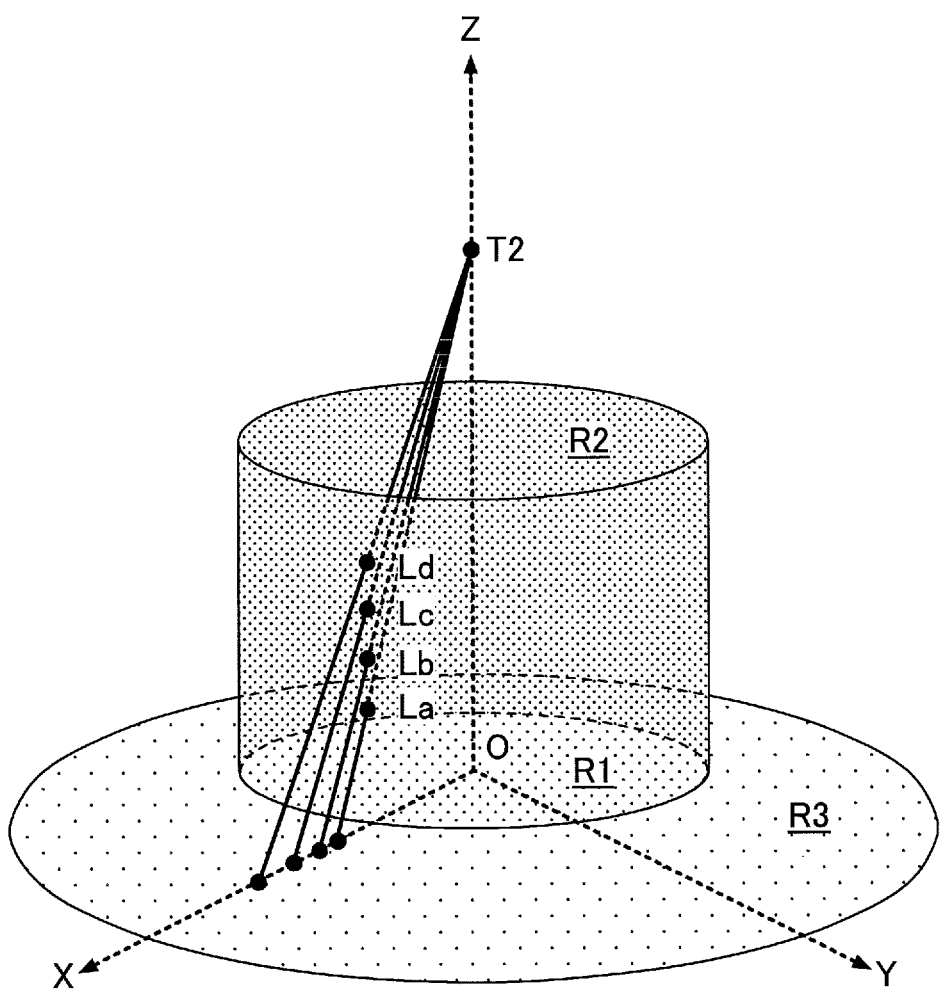
FIG. 8B is a view illustrating a state where all of a group of auxiliary lines extend from a start point on the Z-axis toward the processing-target image plane.

Next, a description is given, with reference to FIGS. 8A and 8B, of an alternative example of the group of parallel lines PL, which the coordinates correspondence part 10 introduces to cause the coordinates on the space model MD to correspond to the coordinates on the processing-target image plane R3.

FIG. 8A is a view of a case where all of a group of auxiliary lines AL positioned on the XZ-plane extend from a start point T1 on the Z-axis toward the processing-target image plane R3. FIG. 8B is a view of a case where all of the group of auxiliary lines AL positioned on the XZ-plane extend from a start point T2 on the Z-axis toward the processing-target image plane R3. The coordinates La through Ld on the curved surface area R2 of the space model MD in FIGS. 8A and 8B correspond to the coordinates Ma through Md on the processing-target image plane R3, respectively. In the example illustrated in FIG. 8A, the coordinates Mc and Md are not illustrated in the figure because they are out of the range of the processing-target image plane R3. The intervals of the coordinates La through Ld in FIG. 8A are equal to the intervals of the coordinates La through Ld in FIG. 8B, respectively. It should be noted that although the group of auxiliary lines AL are supposed to be on the XZ-plane for the purpose of simplification of description, actually, the auxiliary lines radially extend from an arbitrary point on the Z-axis toward the processing-target image plane R3. Similar to the example illustrated in FIGS. 7A and 7B, the Z-axis in this case is referred to as "re-projection axis".

As illustrated in FIGS. 8A and 8B, the intervals of the coordinates Ma through Md on the processing-target image plane R3 decease nonlinearly as the distance (height) between the start point of the group of auxiliary lines AL and the original point O increases. That is, a degree of decrease of each of the intervals increases as the distance between the curved surface area R2 of the space model MD and each of the coordinated Ma through Md increases. On the other hand, in the example illustrated in FIGS. 8A and 8B, because a conversion to the group of coordinates on the processing-target image plane R3 is not performed, the intervals of the group of coordinates on the plane surface area R1 of the space model MD do not change.

Similar to the case of the group of parallel lines PL, the change in the intervals of the group of coordinates means that only an image portion corresponding to the image projected on the curved surface area R2 of the space model MD from among the image portions on the output image plane R5 (refer to FIG. 6C) is enlarged or reduced nonlinearly.

As explained above, the image generation device 100 can linearly or nonlinearly enlarge or reduce an image portion (for example, a horizontal image) of the output image corresponding to the image projected on the curved surface area R2 of the space model MD without giving an influence to an image portion (for example, a road image) of the output image corresponding to the image projected on the plane surface area R1 of the space model MD. Thereby, an object positioned around the excavator 60 (an object in an image a circumference viewed from the excavator 60 in a horizontal direction) can be rapidly and flexibly enlarged or reduced without giving an influence to a road image (a virtual image when viewing the shovel from directly above) in the vicinity of the excavator 60, which can improve visibility of a dead angle area of the excavator 60.

Next, a description will be given, with reference to FIGS. 9A and 9B, of a difference between a case where an output image is generated directly from an image projected on the space model MD and a case where an image projected on the space model MD is re-projected on the processing-target image and an output image is generated from the re-projected processing-target image.

Figure 9A:
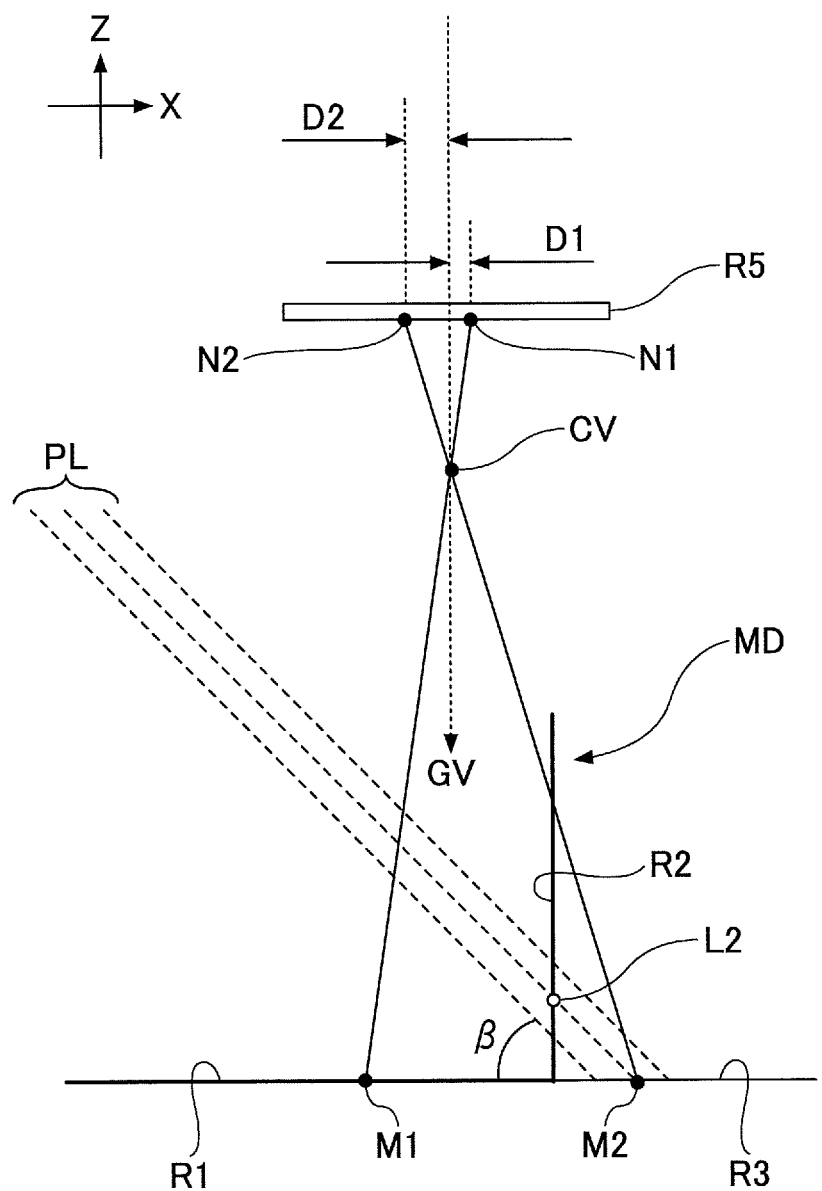
FIG. 9A is a view illustrating a state where an angle β is formed between a group of parallel lines positioned on the XZ-plane and a processing-target image plane.

FIG. 9A is a view of a case where an angle $\beta$ is formed between the group of parallel lines PL positioned on the XZ-plane and the processing-target image plane R3. FIG. 9B is a view of a case where an angle $\beta 2$ ($\beta 2 > \beta$) is formed between the group of parallel lines PL positioned on the XZ-plane and the processing-target image plane R3. It is assumed that the plane surface area R1 and the curved surface area R2 of the space model MD, the processing-target image plane R3, the output image plane R5 and the optical center CV of the virtual camera 2V using a normal projection (h=f tan $\alpha$) in FIG. 9A are common to those of FIG. 9B, respectively.

Figure 9B:
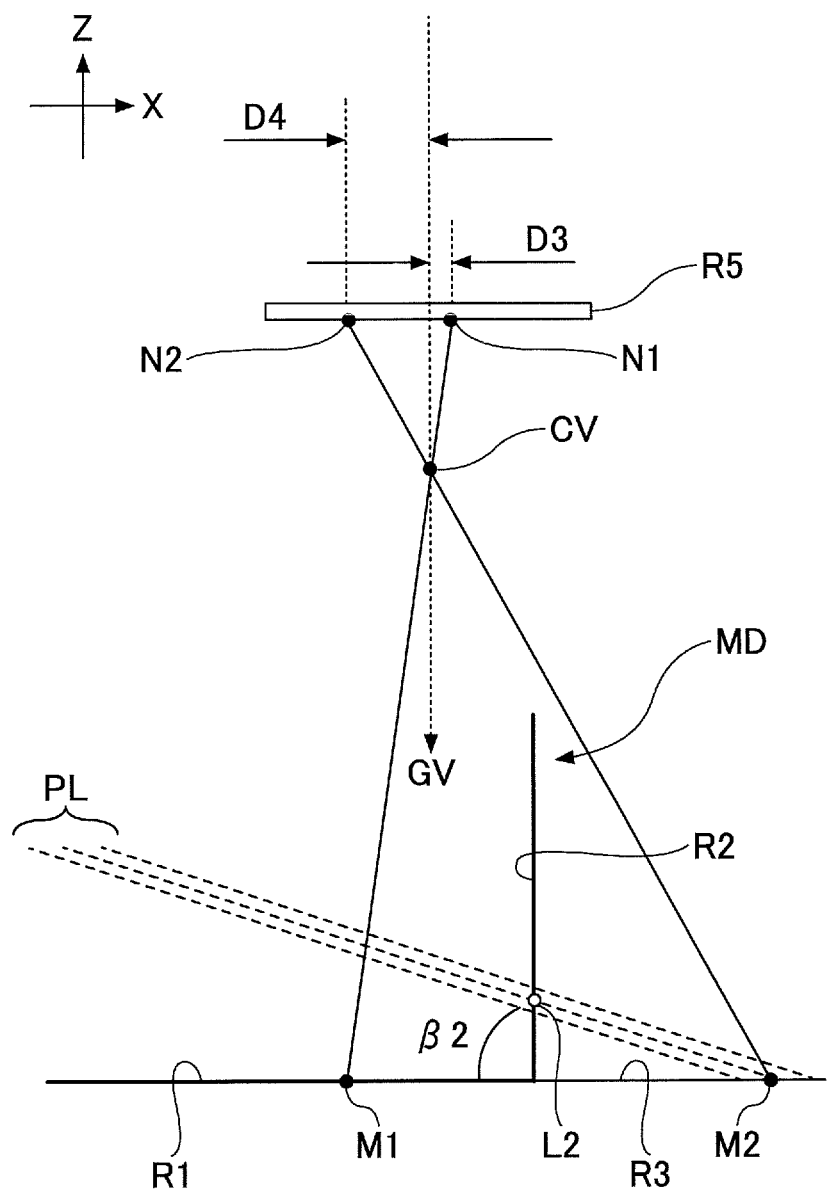
FIG. 9B is a view illustrating a state where an angle β2 is formed between a group of parallel lines positioned on the XZ-plane and a processing-target image plane.

In FIGS. 9A and 9B, the coordinates M1 on the processing-target image plane R3 containing the plane surface area R1 correspond to the coordinates N1 on the output image plane R5, and the coordinates L2 on the curved surface area R2 correspond to the coordinates M2 on the processing-target image plane R3 and the coordinates N2 on the output image plane R5. A distance D1 (D3) indicates a distance on the X-axis between the central point (an intersection with the optical axis G of the virtual camera 2V) of the output image plane R5 and the coordinates N1. A distance D2 (D4) indicates a distance on the X-axis between the central point of the output image plane R5 and the coordinates N2.

As illustrated in FIGS. 9A and 9B, the distance D2 (refer to FIG. 9A), when the angle between the group of parallel lines PL and the processing-target image plane R3 is $\beta$, increases as the angle decreases, and it becomes the distance D4 when the angle is $\beta 2$. The distance D1, when the angle is $\beta$, is constant irrespective of changes in the angle, and is equal to the distance D3 when the angle is $\beta 2$ (refer to FIG. 9B).

That the distance D2 changes to the distance D4 and the distance D1 is constant means that only an image portion corresponding to an image projected on the curved surface area R2 of the space model MD from among the image portions on the output image plane R5 is enlarged or reduced, similar to the action explained with reference to FIGS. 7A and 7B and FIGS. 8A and 8B.

It should be noted that when an output image is generated directly based on the image projected on the space model MD, the image portion on the output image plane R5 corresponding to the image projected on the curved surface area R2 alone cannot be enlarged or reduced because the plane surface area R1 and the curved surface area R2 cannot handle separately (because they cannot be separate objects to be enlarged or reduced).

Figure 10:
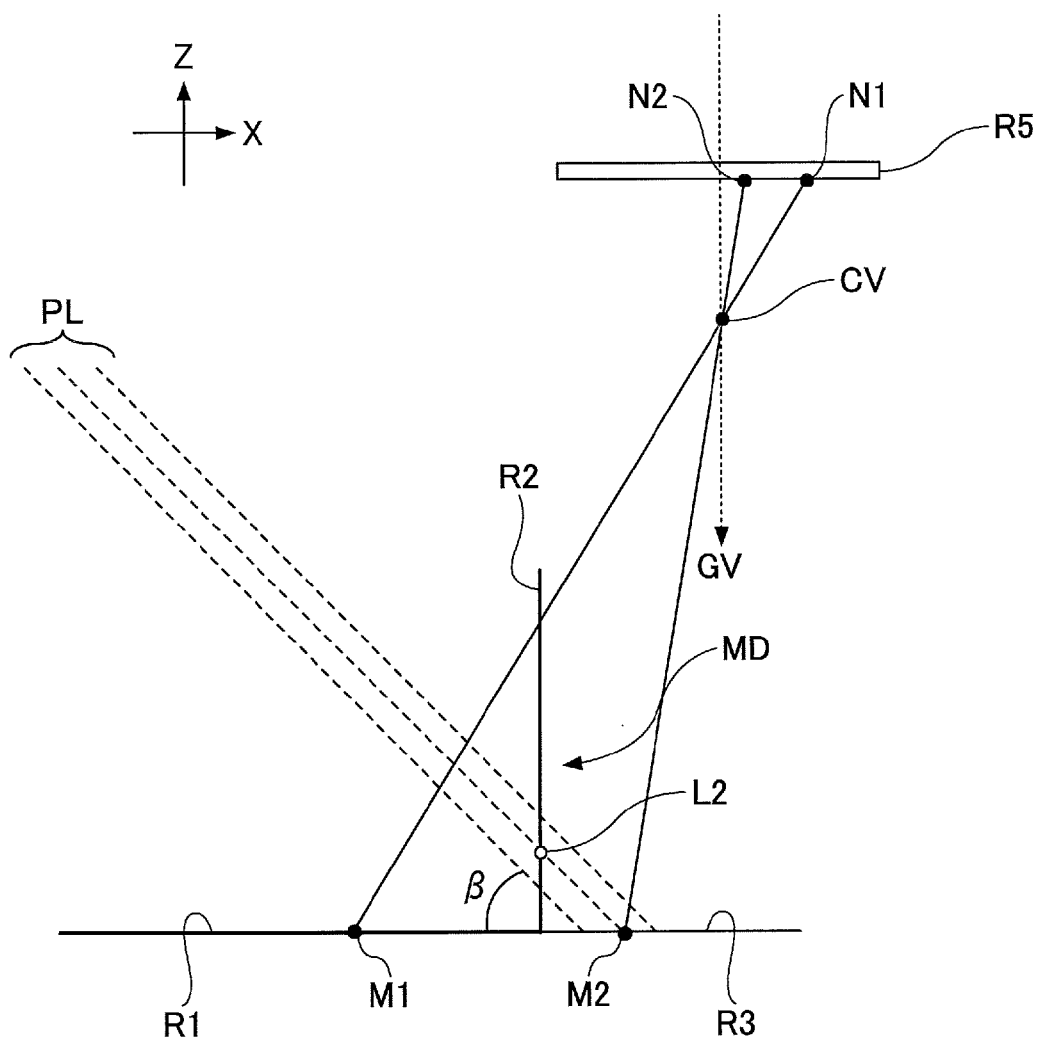
FIG. 10 is a view illustrating a state where an angle β is formed between a group of parallel lines positioned on the XZ-plane and a processing-target image plane.

FIG. 10 is a view of a case where an angle 1 is formed between the group of parallel lines PL positioned on the XZ-plane and the processing-target image plane R3. FIG. 10 illustrates a state where the optical center CV of the virtual camera 2V using a normal projection (h=f tan α) is moved outside the space model MD (a state where a value of the X-coordinate of the optical center CV is set larger than a radius of the plane surface area R1).

As illustrated in FIG. 10, the output image generation part 11 causes the coordinate point M1 on the processing-target image plane R3 (the plane surface area R1) to correspond to the coordinate point N1 on the output image plane R5 so that the line segment M1-N1 passes the optical center CV, and causes the coordinate point M2 on the processing-target image plane R3 corresponding to the coordinate point L2 on the curved surface area R2 to correspond to the coordinate point N2 on the output image plane R5 so that the line segment M2-N2 passes the optical center CV. Thereby, a problem that an appropriate output image cannot be generated because an outer surface of the side wall of the cylinder is viewed (a problem that the coordinates on the space model MD cannot be caused to correspond to the coordinates on the output image plane R5) is not arisen as in a case where an output image is generated directly from an image projected on the curved surface area R2 of the space model MD.

It should be noted that a description was given, with reference to FIGS. 9A and 9B and FIG. 10, of the virtual camera 2V using a normal projection, and the same applies to a virtual camera 2V using projection system (for example, an orthogonal projection, a stereographic projection, an equisolid angle projection, an equidistant projection, etc.) other than the normal projection. In such a case, the output image generation part 11 causes the coordinates on the output image plane R5 to correspond to the coordinates on the processing-target image plane R3 in accordance with a function (for example, an orthogonal projection (h=f sin α), a stereographic projection (h=2f tan(α/2)), an equisolid angle projection (h=f sin(α/2)), an equidistant projection (h=fα), etc.) corresponding to the respective projection system instead of causing the coordinate point M1 on the processing-target image plane R3 (the plane surface area R1) to correspond to the coordinate point N1 on the output image plane R5 (according to the function h=f tan α) so that the line segment M1-N1 passes the optical center CV. In this case, the line segment M1-N1 does not pass the optical center CV of the virtual camera 2V.

Figure 11:
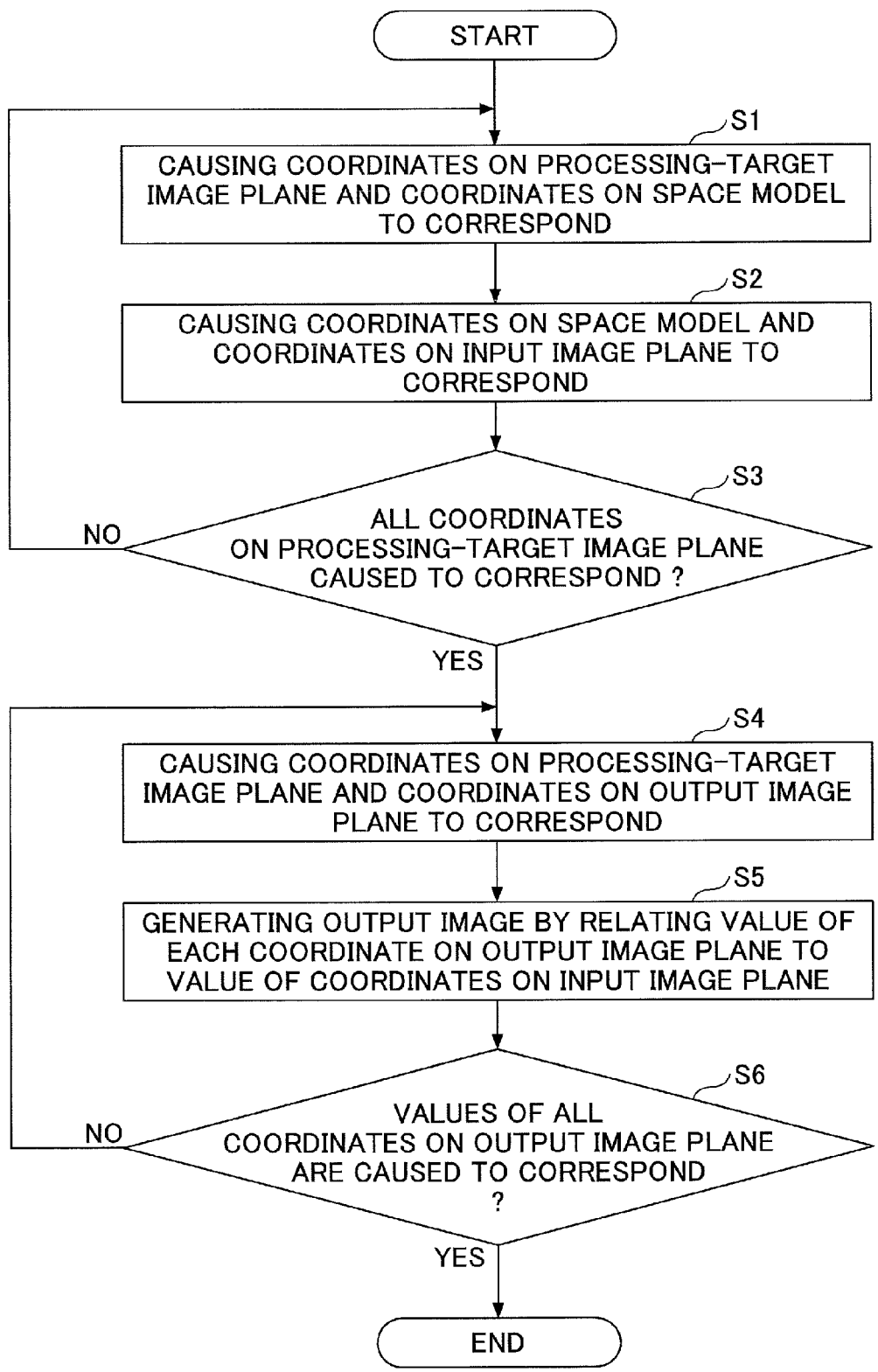
FIG. 11 is a flowchart of a processing-image generation process and an output image generation process.

Next, a description will be given, with reference to FIG. 11, of a process of generating a processing-target image by the image generation device (hereinafter, referred to as "processing-target image generation process") and a process of generating an output image using the generated processing-target image (hereinafter, referred to as "output image generation process"). FIG. 11 is a flowchart of the processing-target generation process (step S1 through step S3) and the output image generation process (step S4 through step S6). It is assumed that the arrangement of the camera 2 (the input image plane R4), the space model (the plane surface area R1 and the curved surface area R2) and the processing-target image plane R3 is previously determined.

First, the control part 1 causes a coordinate point on the processing-target image plane R3 to correspond to a coordinate point on the space model MD by the coordinates correspondence part 10 (step S1).

Specifically, the coordinates correspondence part 10 acquires an angle formed between the group of parallel lines PL and the processing-target image plane R3, and computes a point at which one of the group of parallel lines PL extending from the coordinate point on the processing-target image plane R3 intersects with the curved surface area R2 of the space model MD. Then, the coordinates correspondence part 10 derives a coordinate point on the curved surface area R2 corresponding to the computed point as a coordinate point on the curved surface area R2 corresponding to a coordinate point on the processing-target image plane R3, and stores a correspondence relationship therebetween in the space model—processing-target image correspondence relation map 41. The angle formed between the group of parallel lines PL and the processing-target image plane R3 may be a value previously stored in the storage part 4, etc., or may be a value dynamically input by the operator through the input part 3.

When the coordinates on the processing-target image plane R3 is coincident with the coordinates on the plane surface area R1 on the space model MD, the coordinates correspondence part 10 derives the coordinates on the plane surface area R1 concerned as the coordinates corresponding to the coordinates on the processing-target image plane R3, and stores a correspondence relationship therebetween in the space model—processing-target image correspondence relation map 41.

Thereafter, the control part 1 causes the coordinates on the space model MD derived by the above mentioned process to correspond to the coordinates on the input image plane R4 by the coordinates correspondence part 10 (step S2).

Specifically, the coordinates correspondence part 10 acquires the coordinate point of the optical center C of the camera 2 using a normal projection (h=f tan α), and computes a point at which a line segment extending from a coordinate point on the space model MD, which is a line segment passing the optical center C, intersects with the input image plane R4. Then, the coordinates corresponding part 10 derives a coordinate point on the input image plane R4 corresponding to the computed point as a coordinate point on the input image plane R4 corresponding to the coordinate point on the space model MD, and stores a correspondence relationship therebetween in the input image—space model map 40.

Thereafter, the control part 1 determines whether or not all of the coordinate points on the processing-target image plane R3 are caused to correspond to coordinate points on the space model MD and the coordinate points on the input image plane R4 (step S3). If it is determined that all of the coordinate points have not been caused to correspond (NO of step S3), the process of step S1 and step S2 is repeated.

On the other hand, if it is determined that all of the coordinate points are caused to correspond (YES of step S3), the control part 1 causes the processing-target image generation process to end and, thereafter, causes the output image generation process to start. Thereby, the output mage generation part 11 causes the coordinates on the processing-target image plane R3 to the coordinates on the output image plane R5 (step S4).

Specifically, the output image generation part 11 generates an output image by applying a scale conversion, an affine conversion or a distortion conversion to a processing-target image. Then, the output image generation part 11 stores a correspondence relationship between the coordinates on the processing-target image plane R3 and the coordinates on the output image plane R5 in the processing-target image—output image correspondence relation map 42, the correspondence relationship being determined according to the applied scale conversion, affine conversion, or distortion conversion.

Alternatively, when generating the output image using the virtual camera 2V, the output image generation part 11 may compute the coordinates on the output image plane R5 from the coordinates on the processing-target image plane R3, and may store a correspondence relationship therebetween in the processing-target image—output image correspondence relation map 42.

Alternatively, when generating the output image using the virtual camera 2V using a normal projection (h=f tan α), the output image generation part 11 may compute, after acquiring the coordinate point of the optical center CV of the virtual camera 2V, a point at which a line segment extending from a coordinate point on the output image plane R5, which line segment passes the optical center CV, intersects with the processing-target image plane R3. Then, the output image generation part 11 may derive the coordinated on the processing-target image plane R3 corresponding to the computed point as a coordinate point on the processing-target image plane R3 corresponding to the coordinate point on the output image plane R5, and may store a correspondence relationship therebetween in the processing-target image—output image correspondence relation map 42.

Thereafter, the control part 1 follows, by the output-image generation part 11, the correspondence relationship between the coordinates on the input image plane R4 and the coordinates on the space model MD, the relationship between the coordinates on the space model MD and the coordinates on the processing-target image plane R3 and the correspondence relationship between the processing-target image plane R3 and the coordinates on the output mage plane R5, while referring to the input image—space model correspondence relation map 40, the space model—processing-target image correspondence relation map 41 and the processing-target image—output image correspondence relation map 42, and acquires values (for example, a brightness value, a color phase value, a chroma value, etc.) possessed by coordinates on the input image plane R4 corresponding to the coordinates on the output image plane R5. It should be noted that, when a plurality of coordinates on a plurality of input image planes R4 correspond to one coordinate point on the output image plane R5, the output image generation part 11 may derive statistical values (for example, a mean value, a maximum value, a minimum value, an intermediate value, etc.) based on each of the values of the plurality of coordinates on the plurality of input image planes R4, and may use the statistical values as the values of the coordinates on the output image plane R5.

Thereafter, the control part 1 determines whether or not all of the values of the coordinates on the output image plane R5 are caused to correspond to the values of the coordinates on the input mage plane R4 (step S6). If it is determined that all of the values of the coordinates have not been caused to correspond (NO of step S4), the process of step S5 is repeated.

On the other hand, if it is determined that all of the values of the coordinates have been caused to correspond (YES of step S6), the control part 1 generates an output image, and ends the series of processes.

It should be noted that when the image generation device 100 does not generate a processing-target image, the processing-target image generation process is omitted, and the "coordinates on the processing-target image plane" in step S4 of the output image generation process is read as "coordinates on the space model".

According to the above-mentioned structure, the image generation device 100 is able to generate the processing-target image and the output image that can cause the operator to intuitively grasp the positional relationship between the construction machine and a peripheral obstacle.

The image generation device 100 is capable of surely causing each coordinate point on the processing-target plane R3 to correspond to one or more coordinate points on the input image plane R4 by performing the correspondence operation to track back from the processing-target image plane R3 to the input image plane R4 through the space model MD. Therefore, a better quality processing-target image can be generated as compared to a case where a coordinate correspondence operation is performed in an order from the input image plane R4 to the processing-target image plane R3 through the space model MD. It should be noted that when performing a coordinate correspondence operation in an order from the input image plane R4 to the processing-target image plane R3 through the space model MD, each of the coordinate points on the input image plane R4 can be caused to correspond to one or more coordinate points on the processing-target image plane R3, however, there may be a case where a part of the coordinate points on the processing-target image plane R3 cannot be caused to correspond to any one of the coordinate points on the input mage plane R4. In such a case, it is necessary to apply an interpolation process to the part of the coordinate points on the processing-target image plane R3.

Moreover, when enlarging or reducing only an image corresponding to the curved surface area R2 of the space model MD, the image generation device 100 can realize a desired enlargement or reduction by merely rewriting only a part associated with the curved surface area R2 in the space model—processing-target image correspondence relation map 41 by changing the angle formed between the group of parallel lines PL and the processing-target image plane R3 without rewriting the contents of the input image—space model correspondence relation map 40.

Moreover, when changing an appearance of the output image, the image generation device 100 is capable of generating a desire output image (a scale conversion image, an affine conversion image or a distortion conversion image) by merely rewriting the processing-target image—output image correspondence relation map 42 by changing various parameters regarding a scale conversion, an affine conversion or a distortion conversion without rewriting the contents of the input image—space model correspondence relation map 40 and the contents of the space model—processing-target image correspondence relation map 41.

Similarly, when changing a view point of the output image, the image generation device 100 is capable of generating an output image (view point conversion image) which is viewed from a desired view point by merely rewriting the processing-target image—output mage correspondence relation map 42 by changing values of various parameters of the virtual camera 2V without rewriting the contents of the input image—space model correspondence relation map 40 and the space model—processing-target image correspondence relation map 41.

Next, a description is given, with reference to FIG. 12A through FIG. 14C of a positional relationship between the camera 2 (the right side camera 2R, the backside camera 2B) and the space model MD.

Figure 12A:
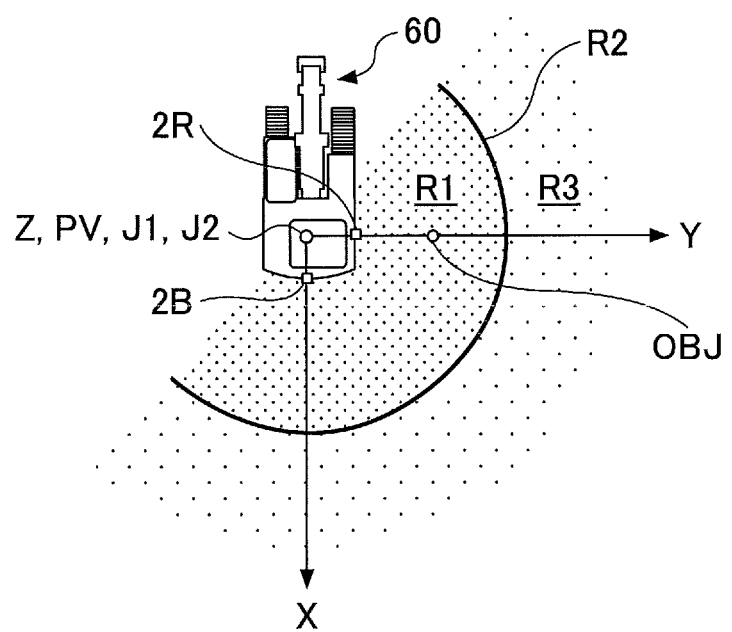
FIG. 12A is a plan view for explaining a positional relationship between a camera and a space model in a case where a single rod-shaped object exists.
Figure 12B:
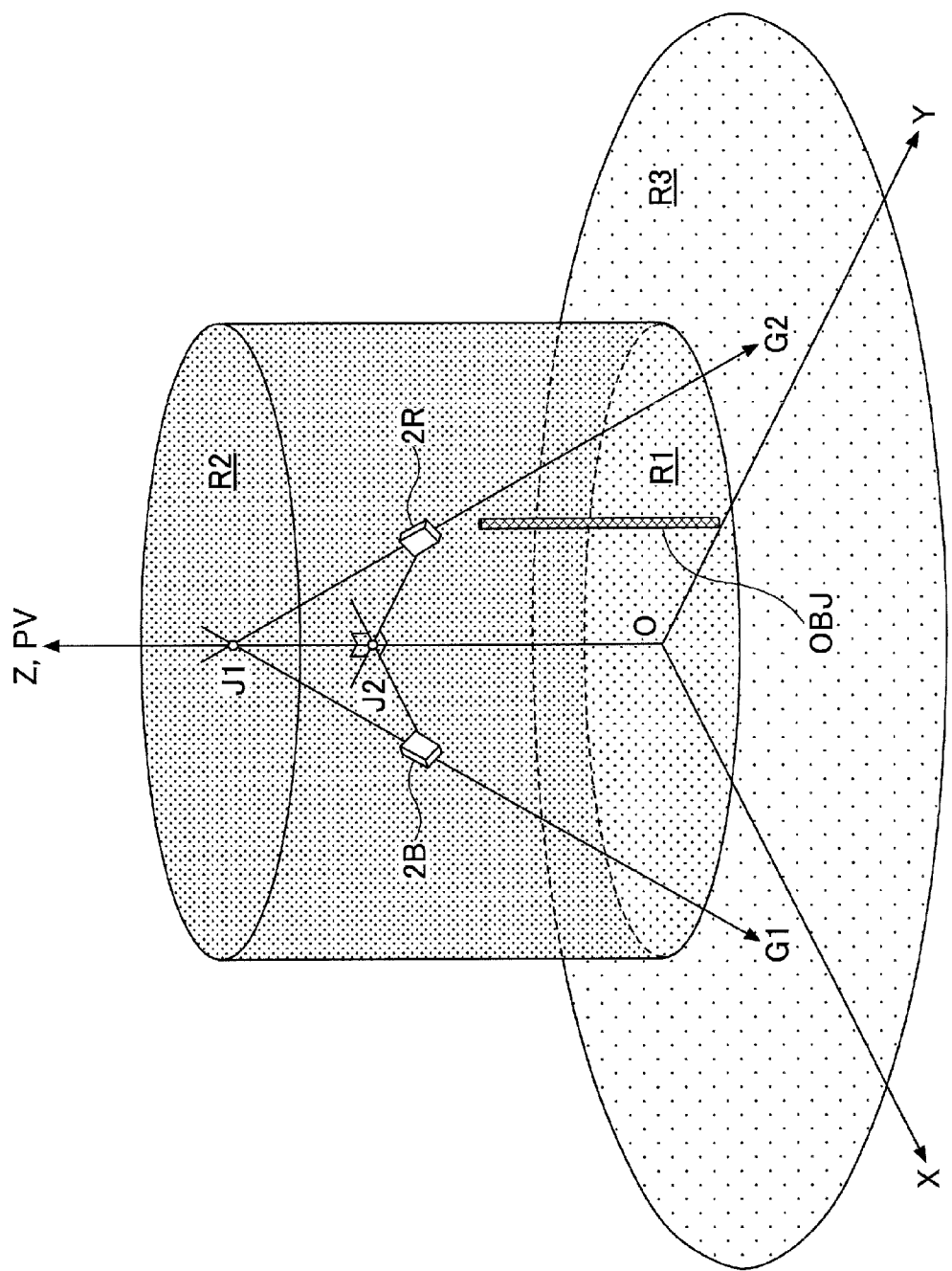
FIG. 12B is a perspective view for explaining a positional relationship between the camera and the space model in the case where the single rod-shaped object exists.

FIG. 12A is a view illustrating a positional relationship between the camera 2 and the space model MD when viewing the excavator 60 from above. FIG. 12B is a view, similar to FIG. 4, illustrating a positional relationship between the camera 2 and the space model MD when viewing the space model MD obliquely from above. FIG.

12C is a view illustrating a processing-target image which the image generation device 100 generates.

As best illustrated in FIG. 12B, the cylinder center axis of the cylindrical space model MD is coincident with the re-projection axis and the tuning axis PV (z-axis) of the excavator 60, and a rod-shaped object OBJ, which extends parallel to the Z-axis, exists on the Y-axis.

In FIG. 12B, the optical axis G1 of the backside camera 2B and the optical axis G2 of the right side camera 2R intersect with the plane surface area R1 of the space model and the plane (XY-plane) on which the processing-target image plane R3 is positioned, respectively. Moreover, the optical axis G1 and the optical axis G2 intersect with each other at a point J1 on the cylinder center axis (re-projection axis). It should be noted that the optical axis G1 and the optical axis G2 may be in a twisted positional relationship if the components, when it is projected on a plane parallel to the XY plane, intersect with each other at a point on the cylinder center axis (re-projection axis).

A perpendicular line drawn from the optical center of the backside camera 2B to the cylinder center axis (re-projection axis) is in a perpendicular relationship with a perpendicular line drawn from the optical axis of the right side camera 2R to the cylinder center axis (re-projection axis). Although the two perpendicular lines intersect with each other at a point J2 while existing in the plane parallel to the plane surface area R1 and the plane on which the processing-target image plane R3 is positioned in the present embodiment, the two perpendicular lines may be positioned on separate planes, respectively, and may be in a twisted positional relationship.

Figure 12C:
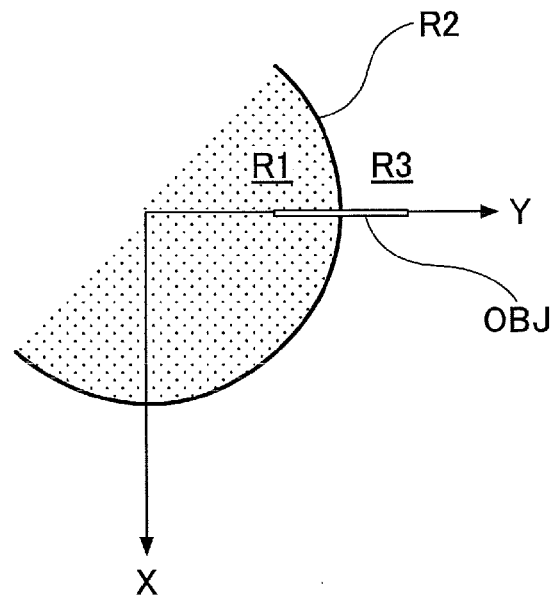
FIG. 12C is a plan view for explaining a processing-target image generated in the case where the single rod-shaped object exists.

According to the positional relationship between the camera 2 and the space model MD illustrated in FIGS. 12A and 12B, the image generation device 100 is capable of generating the processing-target image as illustrated in FIG. 12C. That is, in FIG. 12C, the rod-shaped object OBJ extending parallel to the Z-axis on the Y-axis extends in a direction (a direction of a line passing the optical center of the right side camera 2R and a point on the object OBJ) parallel to the Y-axis in a road image portion corresponding to an image projected on the plane surface area R1. Moreover, in FIG. 12C, the rod-shaped object OBJ extends in a direction (a direction of a line passing a point on the re-projection axis (a start point of the group of parallel lines PL or the group of auxiliary lines AL) and a point on the object OBJ) parallel to the Y-axis in a horizontal image portion corresponding to an image projected on the curved surface area P2. In other words, the object OBJ does not bend at a boundary between the road image portion and the horizontal image portion, but extends like a straight line.

Figure 13A:
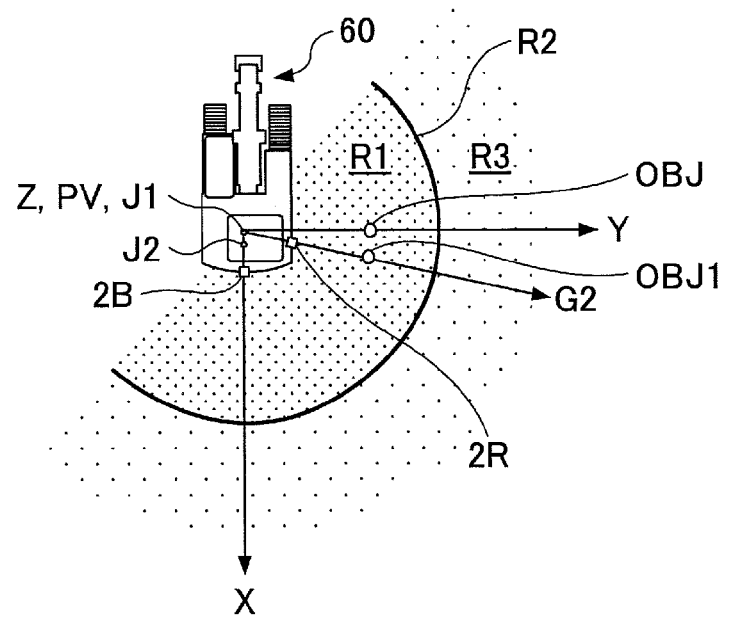
FIG. 13A is a plan view for explaining a positional relationship between a camera and a space model in a case where two rod-shaped objects exist.
Figure 13B:
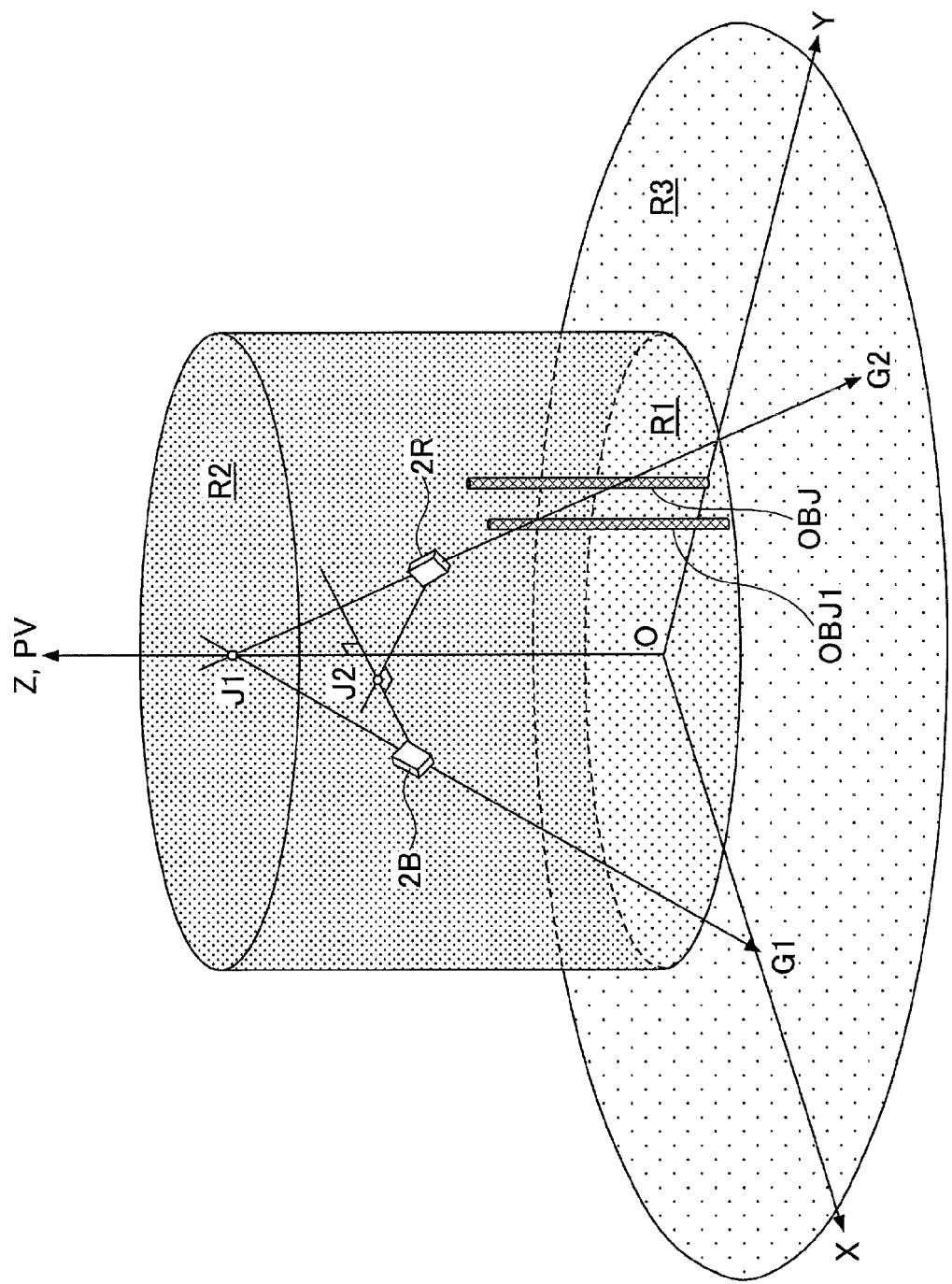
FIG. 13B is a perspective view for explaining a positional relationship between the camera and the space model in the case where the two rod-shaped objects exist.
Figure 13C:
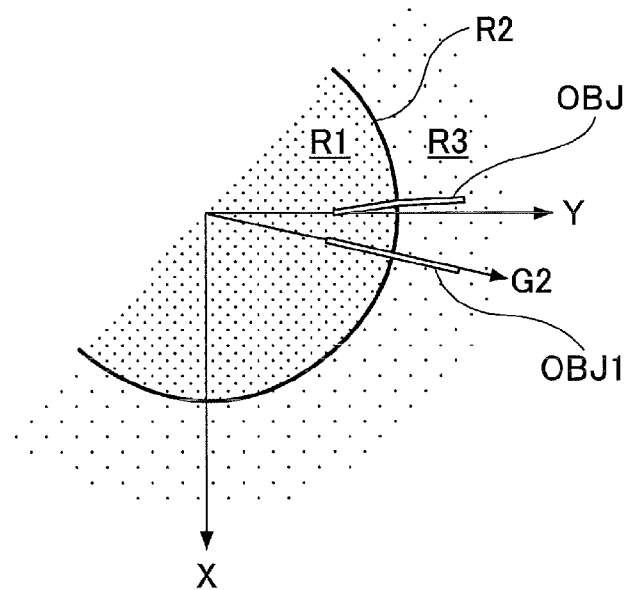
FIG. 13C is a plan view for explaining a processing-target image generated in the case where the two rod-shaped objects exist.

FIGS. 13A through 13C are views similar to FIGS. 12A through 12C, respectively. In the example, illustrated in FIGS. 13A through 13C, the cylinder center axis of the cylindrical space model MD is coincident with the re-projection axis and the turning axis PV (Z-axis) of the excavator 60, and the rod-shaped object OBJ extending parallel to the Z-axis direction exists on the Y-axis. Further, a rod-shaped object OBJ1 extending parallel to the Z-axis direction from the XY-plane exists also in a direction of the optical axis G2 of the right side camera 2R.

In FIG. 13B, similar to the positional relationship illustrated n FIG. 12B, the optical axis G1 of the backside camera 2B and the optical axis G2 of the right side camera 2R intersect with the plane surface area R1 of the space model MD and the plane (XY-plane) on which the processing-target image plane R3 is positioned, respectively. Moreover, the optical axis G1 and the optical axis G2 intersect with each other at a point J1 on the cylinder center axis (re-projection axis). It should be noted that the optical axis G1 and the optical axis G2 may be in a twisted positional relationship if the components, when it is projected on a plane parallel to the XY-plane, intersect with each other at a point on the cylinder center axis (re-projection axis).

On the other hand, a perpendicular line drawn from the optical center of the backside camera 2B to the cylinder center axis (re-projection axis) is not in a perpendicular relationship with a perpendicular line drawn from the optical axis of the right side camera 2R to the cylinder center axis (re-projection axis). The perpendicular line drawn from the optical center of the backside camera 2B to the cylinder center axis (re-projection axis) intersect with the perpendicular line drawn from the optical axis of the right side camera 2R to the perpendicular line thereof at a point J2 which is not on the cylinder center axis (re-projection axis). In the present embodiment, the optical centers of the backside camera 2B and the right side camera 2R exist on a plane parallel to the plane surface area R1 and the plane on which the processing-target image plane R3 is positioned. However, the optical centers of the backside camera 2B and the right side camera 2R may be positioned on different planes, respectively, and the perpendicular lines of each other may be in a twisted positional relationship.

According to the positional relationship between the camera 2 and the space model MD illustrated in FIGS. 13A and 13B, the image generation device 100 is capable of generating the processing-target image as illustrated in FIG. 13C. In FIG. 13C, the rod-shaped object OBJ extending parallel to the Z-axis on the Y-axis extends in a direction (a direction of a line passing the optical center of the right side camera 2R and a point on the object OBJ) slightly separate from the Y-axis in a road image portion corresponding to an image projected on the plane surface area R1. Moreover, the rod-shaped object OBJ extends in a direction (a direction of a line passing a point on the re-projection axis (a start point of the group of parallel lines PL or the group of auxiliary lines AL) and a point on the object OBJ) parallel to the Y-axis in a horizontal image portion corresponding to an image projected on the curved surface area R2. In other words, the object OBJ is slightly bent at a boundary between the road image portion and the horizontal image portion.

On the other hand, as illustrated in FIG. 13C, the rod-shaped object OBJ1 extending parallel to the Z-axis and existing in the direction of the optical axis G2 of the right side camera 2R extends in a direction (a direction of a line passing the optical center of the right side camera 2R and a point on the object OBJ) parallel to the optical axis G2 a road image portion corresponding to an image projected on the plane surface area R1. Moreover, the rod-shaped object OBJ1 extends in a direction (a direction of a line passing a point on the re-projection axis (a start point of the group of parallel lines PL or the group of auxiliary lines AL) and a point on the object OBJ1) parallel to the optical axis G2 in a horizontal image portion corresponding to an image projected on the curved surface area P2. In other words, the object OBJ does not bend at a boundary between the road image portion and the horizontal image portion, but extends like a straight line.

Figure 14A:
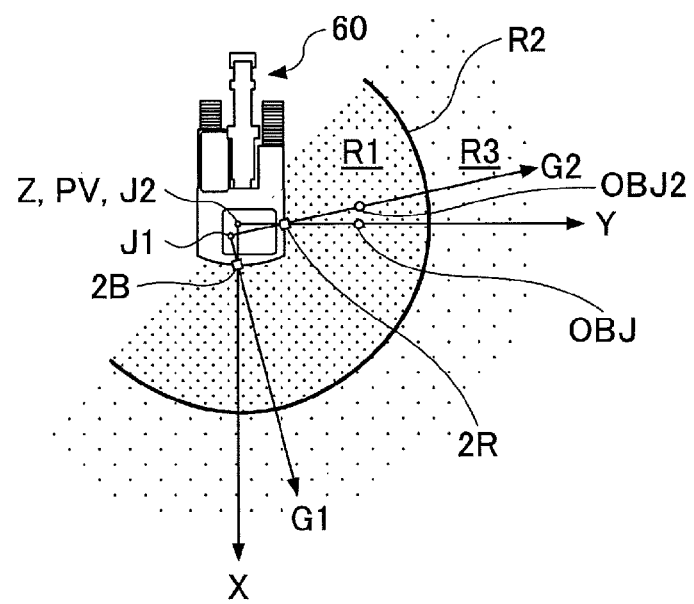
FIG. 14A is a plan view for explaining a positional relationship between a camera and a space model in another case where two rod-shaped objects exist.
Figure 14B:
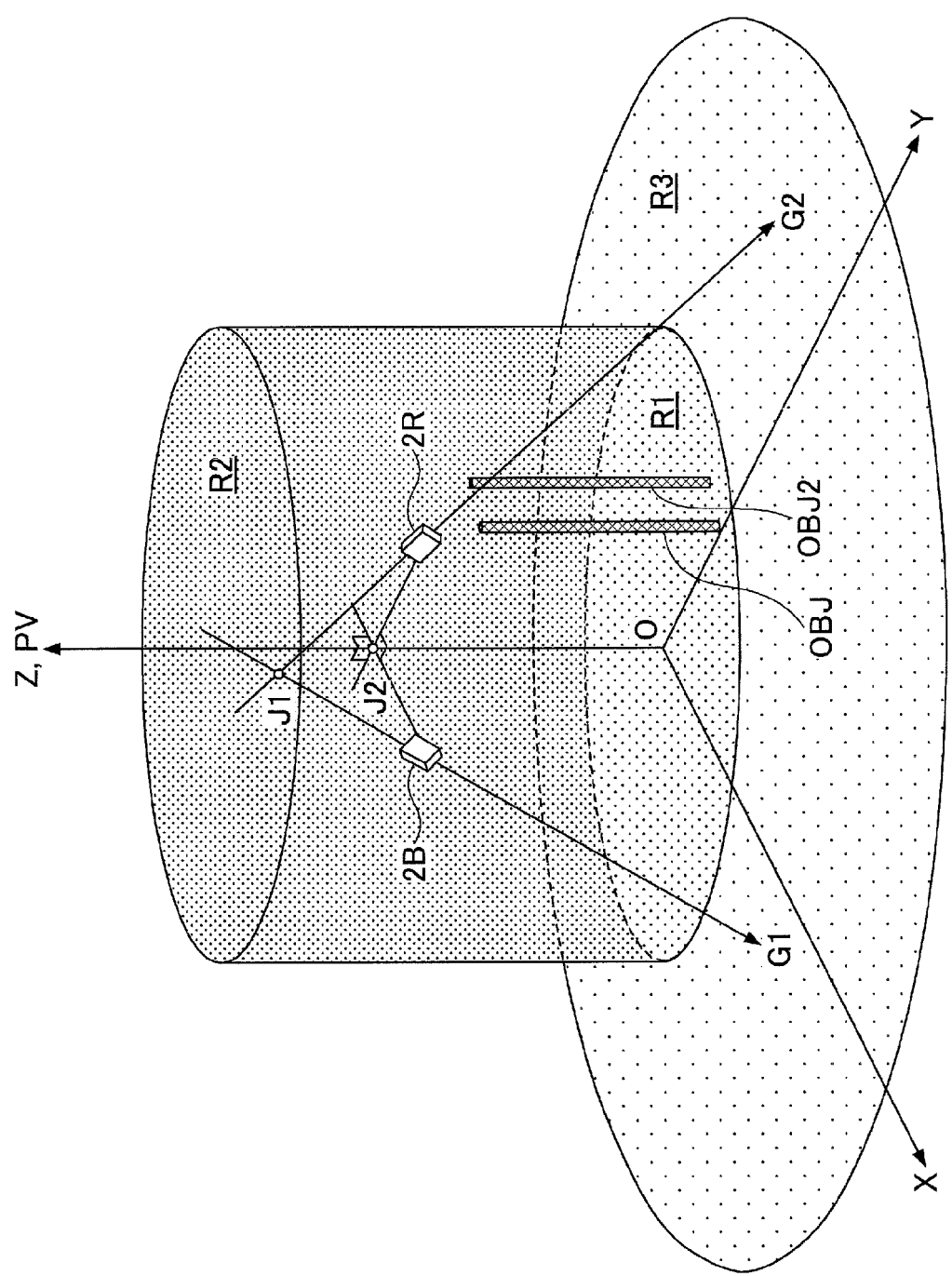
FIG. 14B is a perspective view for explaining a positional relationship between the camera and the space model in another case where the two single rod-shaped objects exist.
Figure 14C:
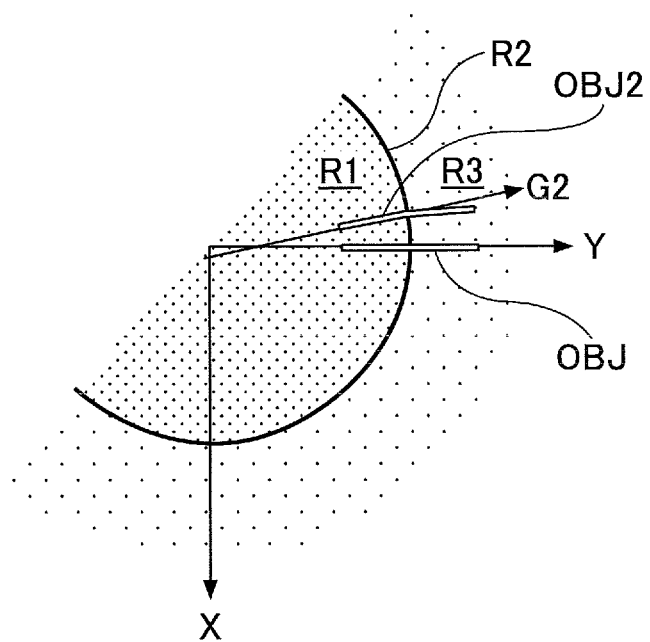
FIG. 14C is a plan view for explaining a processing-target image generated in another case where the two rod-shaped objects exist.

FIGS. 14A through 14C are views similar to FIGS. 12A through 12C, respectively. In the example, illustrated in FIGS. 14A through 14C, the cylinder center axis of the cylindrical space model MD is coincident with the re-projection axis and the turning axis PV (Z-axis) of the excavator 60, and the rod-shaped object OBJ extending parallel to the Z-axis direction exists on the Y-axis. Further, a rod-shaped object OBJ extending parallel to the Z-axis direction from the XY-plane exists also in a direction of the optical axis G2 of the right side camera 2R.

In FIG. 14B, similar to the positional relationship illustrated n FIG. 12B, the optical axis G1 of the backside camera 2B and the optical axis G2 of the right side camera 2R intersect with the plane surface area R1 of the space model MD and the plane (XY-plane) on which the processing-target image plane R3 is positioned, respectively. Moreover, a perpendicular line drawn from the optical center of the backside camera 2B to the cylinder center axis (the re-projection axis) is in a perpendicular relationship with a perpendicular line drawn from the optical center of the right side camera 2R to the cylinder center axis (re-projection axis). In the present embodiment, the optical centers of the backside camera 2B and the right side camera 2R exist on a plane parallel to the plane surface area R1 and a plane on which the processing-target image plane R3 is positioned. However, the optical centers of the backside camera 2B and the right side camera 2 may be positioned on different planes, respectively, and the perpendicular lines may be mutually in a twisted positional relationship.

On the other hand, the optical axis G1 and the optical axis G2 do not intersect with each other on the cylinder center axis (re-projection axis) but intersect at a point J1 which does not exist on the cylinder center axis (re-projection axis). It should be noted that the optical axis G1 and the optical axis G2 may be in a twisted positional relationship if components of a projection on a plane parallel to the XY-plane intersect at points which do not exist on the cylinder center axis (re-projection axis).

According to the positional relationship between the camera 2 and the space model MD illustrated in FIGS. 14A and 14B, the image generation device 100 generates the processing-target image as illustrated in FIG. 14C. In FIG. 14C, the rod-shaped object OBJ2 extending parallel to the Z-axis in a direction of the optical axis G2 of the right side camera 2R extends in a direction (a direction of a line passing the optical center of the right side camera 2R and a point on the object OBJ2) parallel to the optical axis G2 in a road image portion corresponding to an image projected on the plane surface area R1. Moreover, the rod-shaped object OBJ2 extends in a direction (a direction of a line passing a point on the re-projection axis (a start point of the group of parallel lines PL or the group of auxiliary lines AL) and a point on the object OBJ2) parallel to the Y-axis direction in a horizontal image portion corresponding to an image projected on the curved surface area R2. In other words, the object OBJ2 is slightly bent at a boundary between the road image portion and the horizontal image portion.

On the other hand, as illustrated in FIG. 14C, the rod-shaped object OBJ extending parallel to the Z-axis direction on the Y-axis extends in a direction (a direction of a line passing the optical center of the right side camera 2R and a point on the object OBJ) parallel to the Y-axis direction in the road image portion corresponding to the image projected on the plane surface area R1. Moreover, the rod-shaped object OBJ extends in a direction (a direction of a line passing a point on the re-projection axis (a start point of the group of parallel lines PL or the group of auxiliary lines AL) and a point on the object OBJ) parallel to the Y-axis direction in the horizontal image portion corresponding to the image projected on the curved surface area R2. In other words, the object OBJ does not bend at a boundary between the road image portion and the horizontal image portion, and extends like a straight line.

As mentioned above, the image generation device 100 is capable of generating the processing-target image by arranging the space model MD so that the cylinder center axis (re-projection axis) of the space model MD and the optical axis of the camera intersect with each other without bending an object existing in an optical axis direction of the camera at a boundary between the road image portion and the horizontal image portion. It should be noted that this advantage can be obtained in a case of a single camera or a case of three or more cameras.

Moreover, the image generation device 100 is capable of generating the processing-target image by arranging the space model MD so that the perpendicular lines drawn from the optical centers of the backside camera 2B and the right side camera 2R to the cylinder center axis (re-projection axis) of the space model MD are perpendicular to each other without bending objects on a just right had side and just behind the excavator 60 at a boundary between the road image portion and the horizontal image portion. It should be noted that this advantage can be obtained in a case of three or more cameras.

It should be noted that although the positional relationship between the camera (right side camera 2R and the backside camera 2B) and the space model MD illustrated in FIG. 12A through FIG. 14C and the action and effect thereof correspond to the case where the image generation device 100 generates the processing-target image, the same action and effect can be obtained even in a case where the image generation device 100 does not generate the processing-target image (a case where the processing-target image plane R3 does not exist). In this case, the processing-target image illustrated in FIGS. 12C, 13C and 14C are read and substituted by the output image generated using an image projected on the space model MD.

Figure 15:
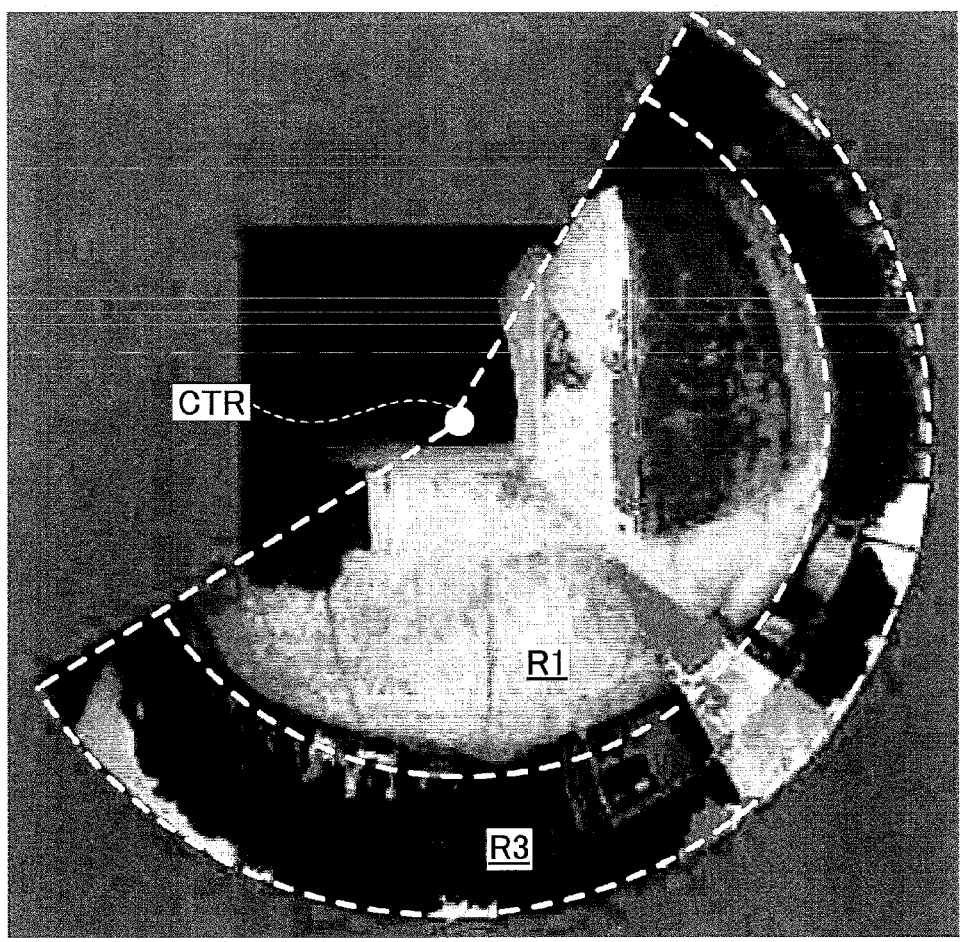
FIG. 15 is a view illustrating an example of display of an output image.

FIG. 15 is an example of a display when causing the display part 5 to display an output image generated using an input image of two cameras (the right side camera 2R and the backside camera 2B) mounted on the excavator 60. The image generation device 100 generates the processing-target image by projecting a portion of the input image on the plane surface area R1 of the space model MD and projecting another portion of the input image on the curved surface area R2 of the space model MD and thereafter re-projecting the input image on the processing-target image plane R3. The image generation device 100 displays the image based on the generated processing-target image by combining an image which views a vicinity of the shovel from above, which corresponds to the image projected on the plane surface area R1, and an image of a view from the excavator 60 in a horizontal direction, which corresponds to the image re-projected on the curved surface area R2.

It should be noted that when the image generation device 100 does not generate the processing-target image, the output image is generated by applying an image conversion process (for example, a view point conversion process) to the image projected on the space model MD.

The output image is trimmed to be in a circular shape so that the image when the excavator 60 performs a turning operation can be displayed without uncomfortable feel. That is, the output image is displayed so that the center CTR of the circle is at the cylinder center axis of the space model, and also on the turning axis PV of the excavator 60, and the output image rotates about the center CTR thereof in response to the turning operation of the excavator 60. In this case, the cylinder center axis of the space model MD may be coincident with or not coincident with the re-projection axis.

The radius of the space model is, for example, 5 meters. The angle formed by the group of parallel lines PL between the processing-target image plane R3 or the height of the start point of the group of auxiliary lines AL may be set so that, when an object (for example, an operator) exists at a position distant from the turning center of the excavator 60 by a maximum reach distance (for example, 12 meters) of an excavation attachment E, the object is displayed sufficiently large (for example, 7 millimeters or more).

Further, in the output image, a CG image of the excavator 60 is arranged so that a front of the excavator 60 is coincident with an upper portion of the screen of the display part 5 and the turning center thereof is coincident with the center CTR. This is to facilitate recognition of a positional relationship between the excavator 60 and the object that appears in the output image. It should be noted that, a frame image containing various sets of information such as orientation, etc., may be arranged on a periphery of the output image.

In this state, as illustrated in FIGS. 9A and 9B, the image generation device 100 is capable of enlarging or reducing only an image portion in the output image corresponding to the image, which is projected on the curved surface area R2 and further re-projected on the processing-target image plane R3 without giving an influence to the image portion in the output image corresponding to the image projected on the plane surface area R1. Moreover, as illustrated in FIG. 10, it is possible to move the image portion to an arbitrary position (for example, in a middle) in the screen area of the display part 5 so as to view the image portion in the output image from directly above, the image portion corresponding to an image projected on the curved surface area P2 and further re-projected on the processing-target image plane R3.

Although the image generation device 100 uses the cylindrical space model MD as a space model in the above-mentioned embodiments, the image generation device may use a space model having other columnar shapes such as a polygonal column, etc., or may use a space model constituted by tow planes including a bottom surface and a side surface. Alternatively, the image generation device 100 may be a space model having only a side surface.

The above-mentioned image generation device 100 is mounted together with cameras on a construction machine, which travels by itself and is equipped with movable members, such as a bucket, an arm, a boom, a turning mechanism, etc., and is incorporated into an operation support system which support a movement of the construction machine and operations of those movable members while presenting an image of surrounding areas to an operator. However, the image generation device 100 may be mounted together with cameras on other construction machines (body to be operated), such as an industrial machine, a stationary crane, etc., which has a movable member but does not travel by itself, and may be incorporated into an operation support system which supports operations of the machine.

The present invention is not limited to the specifically disclosed embodiments, and various variations and modifications may be made without departing from the scope of the present invention.

What is claimed is:

1. An image generation device configured to generate a planar output image based on an input image of a surrounding area of a movable object, the input image being acquired with an image-taking device attached to a turnable body of the movable object, the image generation device comprising:
   a memory; and
   a processor coupled to the memory, and configured to convert a rear-view image and a side-view image into the planar output image,
   wherein the planar output image has a shape of a circular sector of a first circle, and includes an image of the movable object at a center of the first circle, and
   wherein the processor is further configured to generate a frame image and display the frame image on a periphery of the planar output image on a display screen, the frame image containing information.

2. The image generation device as claimed in claim 1, wherein the center of the first circle coincides with a turning axis of the turnable body.

* * * * *